US012430162B2

(12) United States Patent
Neiger et al.

(10) Patent No.: US 12,430,162 B2
(45) Date of Patent: Sep. 30, 2025

(54) USER-LEVEL INTERPROCESSOR INTERRUPTS

(71) Applicant: Intel Corporation, Santa Clara, CA (US)

(72) Inventors: Gilbert Neiger, Portland, OR (US); Asit Mallick, Saratoga, CA (US); Rajesh Sankaran, Portland, OR (US); Hisham Shafi, Akko (IL); Vedvyas Shanbhogue, Austin, TX (US); Vivekananthan Sanjeepan, Portland, OR (US); Jason Brandt, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 747 days.

(21) Appl. No.: 17/561,452

(22) Filed: Dec. 23, 2021

(65) Prior Publication Data

US 2023/0099517 A1    Mar. 30, 2023

Related U.S. Application Data

(60) Provisional application No. 63/250,697, filed on Sep. 30, 2021.

(51) Int. Cl.
*G06F 9/30* (2018.01)
*G06F 9/48* (2006.01)
*G06F 9/54* (2006.01)

(52) U.S. Cl.
CPC .......... *G06F 9/4812* (2013.01); *G06F 9/3016* (2013.01); *G06F 9/542* (2013.01)

(58) Field of Classification Search
CPC ....... G06F 9/4812; G06F 9/3016; G06F 9/542
See application file for complete search history.

(56) References Cited

U.S. PATENT DOCUMENTS 7,366,814 B2 *   4/2008   Shimizu ................. G06F 13/24
                                                              710/263
8,117,367 B2 *   2/2012   Conti ...................... G06F 13/24
                                                              710/267

(Continued)

OTHER PUBLICATIONS

European Search Report and Search Opinion, EP App. No. 22193008.4, Jan. 18, 2023, 8 pages.

(Continued)

*Primary Examiner* — Cheng Yuan Tseng
(74) *Attorney, Agent, or Firm* — Nicholson De Vos Webster & Elliott LLP

(57) ABSTRACT

Processors, methods, and systems for user-level interprocessor interrupts are described. In an embodiment, a processing system includes a memory and a processing core. The memory is to store an interrupt control data structure associated with a first application being executed by the processing system. The processing core includes an instruction decoder to decode a first instruction, invoked by a second application, to send an interprocessor interrupt to the first application; and, in response to the decoded instruction, is to determine that an identifier of the interprocessor interrupt matches a notification interrupt vector associated with the first application; set, in the interrupt control data structure, a pending interrupt flag corresponding to an identifier of the interprocessor interrupt; and invoke an interrupt handler for the interprocessor interrupt identified by the interrupt control data structure.

18 Claims, 24 Drawing Sheets

(56) References Cited

U.S. PATENT DOCUMENTS

| | | | |
|---|---|---|---|
| 8,347,012 B2 * | 1/2013 | Goss | G06F 1/324 |
| | | | 710/261 |
| 8,516,479 B2 * | 8/2013 | Hattori | G06F 9/45558 |
| | | | 718/1 |
| 8,832,688 B2 * | 9/2014 | Tang | G06F 9/45545 |
| | | | 710/262 |
| 10,599,596 B2 | 3/2020 | Pan et al. | |
| 2011/0040914 A1 | 2/2011 | Strauss et al. | |
| 2016/0179721 A1 | 6/2016 | Neiger et al. | |
| 2022/0365802 A1 * | 11/2022 | Neiger | G06F 9/4812 |
| 2023/0027329 A1 * | 1/2023 | Durham | G06F 21/602 |
| 2023/0099517 A1 * | 3/2023 | Neiger | G06F 9/542 |
| | | | 712/244 |
| 2024/0338238 A1 * | 10/2024 | Wang | G06F 9/3016 |

OTHER PUBLICATIONS

Intention to Grant, EP App. No. 22193008.4, Feb. 13, 2025, 6 pages.

* cited by examiner

CLUI—Clear User Interrupt Flag

| Opcode/ Instruction | Op/ En | 64/32 bit Mode Support | CPUID Feature Flag | Description |
|---|---|---|---|---|
| F3 0F 01 EE CLUI | ZO | V/I | UINTR | Clear user interrupt flag; user interrupts blocked when user interrupt flag cleared. |

Instruction Operand Encoding

| Op/En | Tuple | Operand 1 | Operand 2 | Operand 3 | Operand 4 |
|---|---|---|---|---|---|
| ZO | N/A | N/A | N/A | N/A | N/A |

Description

CLUI clears the user interrupt flag (UIF). Its effect takes place immediately: a user interrupt cannot be delivered on the instruction boundary following CLUI.

An execution of CLUI inside a transactional region causes a transactional abort; the abort loads EAX as it would have had it been caused due to an execution of CLI.

Operation

UIF := 0;

Flags Affected

None.

Protected Mode Exceptions
UD          The CLUI instruction is not recognized in protected mode.

Real-Address Mode Exceptions
UD          The CLUI instruction is not recognized in real-address mode.

Virtual-8086 Mode Exceptions
UD          The CLUI instruction is not recognized in virtual-8086 mode.

Compatibility Mode Exceptions
UD          The CLUI instruction is not recognized in compatibility mode.

64-Bit Mode Exceptions
UD          If the LOCK prefix is used.
             If executed inside an enclave.
             If CR4.UINTR = 0.
             If CPUID.07H.0H:EDX.UINTR[bit 5] = 0.

FIG. 6

SENDUIPI — Send User Interprocessor Interrupts

| Opcode/ Instruction | Op/ En | 64/32 bit Mode Support | CPUID Feature Flag | Description |
|---|---|---|---|---|
| F3 0F C7 /6 SENDUIPI reg | A | V/I | UINTR | Send interprocessor user interrupt. |

Instruction Operand Encoding

| Op/En | Tuple | Operand 1 | Operand 2 | Operand 3 | Operand 4 |
|---|---|---|---|---|---|
| A | NA | ModRM:reg (r, w) | NA | NA | NA |

Description

The SENDUIPI instruction takes a single register operand. The operand always has 64 bits; operand-size overrides (e.g., the prefix 66) are ignored.

Although SENDUIPI may be executed at any privilege level, all of the instruction's memory accesses are performed with supervisor privilege.

Virtualization of the SENDUIPI instruction (in particular, that of the sending of the notification interrupt) is discussed in Section 11.9.2.5.

The Operation section refers to the values UITTADDR and UITTSZ. The values are defined in Section 11.3.1. It also includes operations on a user posted-interrupt descriptor (UPID). The format of a UPID is defined in Section 11.5.

Operation

```
IF reg > UITTSZ:
    THEN #GP(0);
FI;
read tempUITTE from 16 bytes at UITTADDR + (reg << 4);
IF tempUITTE.V = 0 or tempUITTE sets any reserved bit (see Section 11.7.1)
    THEN #GP(0);
FI;
read tempUPID from 16 bytes at tempUITTE.UPIDADDR; // under lock
IF tempUPID sets any reserved bits or bits that must be zero (see Table 11-1)
    THEN #GP(0) // release lock
FI;
tempUPID.PIR[tempUITTE.UV] := 1;
IF tempUPID.SN = tempUPID.ON = 0
    THEN
        tempUPID.ON := 1;
        sendNotify := 1;
    ELSE sendNotify := 0;
FI;
write tempUPID to 16 bytes at tempUITTE.UPIDADDR; // release lock
IF sendNotify = 1
    THEN
        IF local APIC is in x2APIC mode
            THEN send ordinary IPI with vector tempUPID.NV
                to 32-bit physical APIC ID tempUPID.NDST;
            ELSE send ordinary IPI with vector tempUPID.NV
                to 8-bit physical APIC ID tempUPID.NDST[15:8];
        FI;
FI;
```

FIG. 7

STUI — Set User Interrupt Flag

| Opcode/ Instruction | Op/ En | 64/32 bit Mode Support | CPUID Feature Flag | Description |
|---|---|---|---|---|
| F3 0F 01 EF STUI | ZO | V/I | UINTR | Set user interrupt flag. |

Instruction Operand Encoding

| Op/En | Tuple | Operand 1 | Operand 2 | Operand 3 | Operand 4 |
|---|---|---|---|---|---|
| ZO | NA | NA | NA | NA | NA |

Description
STUI sets the user interrupt flag (UIF). Its effect takes place immediately; a user interrupt may be delivered on the instruction boundary following STUI. (This is in contrast with STI, whose effect is delayed by one instruction).
An execution of STUI inside a transactional region causes a transactional abort; the abort loads EAX as it would have had it been due to an execution of STI.

Operation
UIF := 1;

Flags Affected
None.

Protected Mode Exceptions
UD             The STUI instruction is not recognized in protected mode.

Real-Address Mode Exceptions
UD             The STUI instruction is not recognized in real-address mode.

Virtual-8086 Mode Exceptions
UD             The STUI instruction is not recognized in virtual-8086 mode.

Compatibility Mode Exceptions
UD             The STUI instruction is not recognized in compatibility mode.

64-Bit Mode Exceptions
UD             If the LOCK prefix is used.
                If executed inside an enclave.
                If CR4.UINTR = 0.
                If CPUID.07H.0H:EDX.UINTR[bit 5] = 0.

FIG. 8

TESTUI — Determine User Interrupt Flag

| Opcode/ Instruction | Op/ En | 64/32 bit Mode Support | CPUID Feature Flag | Description |
|---|---|---|---|---|
| F3 OF 01 ED TESTUI | ZO | V/I | UINTR | Copies the current value of UIF into EFLAGS.CF. |

Instruction Operand Encoding

| Op/En | Tuple | Operand 1 | Operand 2 | Operand 3 | Operand 4 |
|---|---|---|---|---|---|
| ZO | NA | NA | NA | NA | NA |

TESTUI copies the current value of the user interrupt flag (UIF) into EFLAGS.CF. This instruction can be executed regardless of CPL.

TESTUI may be executed normally inside a transactional region.

Operation
CF := UIF;
ZF := AF := OF := PF := SF := 0;

Flags Affected
The ZF, OF, AF, PF, SF flags are cleared and the CF flags to the value of the user interrupt flag.

Protected Mode Exceptions
UD         The TESTUI instruction is not recognized in protected mode.

Real-Address Mode Exceptions
UD         The TESTUI instruction is not recognized in real-address mode.

Virtual-8086 Mode Exceptions
UD         The TESTUI instruction is not recognized in virtual-8086 mode.

Compatibility Mode Exceptions
UD         The TESTUI instruction is not recognized in compatibility mode.

64-Bit Mode Exceptions
UD         If the LOCK prefix is used.
            If executed inside an enclave.
            If CR4.UINTR = 0.
            If CPUID.07H.0H:EDX.UINTR[bit 5] = 0.

FIG. 9

UIRET — User-Interrupt Return

| Opcode/ Instruction | Op/ En | 64/32 bit Mode Support | CPUID Feature Flag | Description |
|---|---|---|---|---|
| F3 0F 01 EC UIRET | ZO | V/I | UINTR | Return from handling a user interrupt. |

Instruction Operand Encoding

| Op/En | Tuple | Operand 1 | Operand 2 | Operand 3 | Operand 4 |
|---|---|---|---|---|---|
| ZO | NA | NA | NA | NA | NA |

Description

UIRET returns from the handling of a user interrupt. It can be executed regardless of CPL.

Execution of UIRET inside a transactional region causes a transactional abort; the abort loads EAX as it would have had it been due to an execution of IRET.

UIRET can be tracked by Architectural Last Branch Records (LBRs), Intel Processor Trace (Intel PT), and Performance Monitoring. For both Intel PT and LBRs, UIRET is recorded in precisely the same manner as IRET. Hence for LBRs, UIRETs fall into the OTHER_BRANCH category, which implies that IA32_LBR_CTL.OTHER_BRANCH[bit 22] must be set to record user-interrupt delivery, and that the IA32_LBR_x_INFO.BR_TYPE field will indicate OTHER_BRANCH for any recorded user interrupt. For Intel PT, control flow tracing must be enabled by setting IA32_RTIT_CTL.BranchEn[bit 13].

UIRET will also increment performance counters for which counting BR_INST_RETIRED.FAR_BRANCH is enabled.

Operation

```
Pop tempRIP;
Pop tempRFLAGS; // see below for how this is used to load RFLAGS
Pop tempRSP;
IF tempRIP is not canonical in current paging mode
    THEN #GP(0);
FI;
IF shadow stack is enabled for CPL = 3
    THEN
        PopShadowStack SSRIP;
        IF SSRIP ≠ tempRIP
            THEN #CP (FAR-RET/IRET);
        FI;
FI;
RIP := tempRIP;
// update in RFLAGS only CF, PF, AF, ZF, SF, TF, DF, OF, NT, RF, AC, and ID
RFLAGS := (RFLAGS & ~254DD5H) | (tempRFLAGS & 254DD5H);
RSP := tempRSP;
UIF := 1;
Clear any cache-line monitoring established by MONITOR or UMONITOR;
```

Flags Affected

See Operation section.

FIG. 10A

Protected Mode Exceptions
UD                The UIRET instruction is not recognized in protected mode.

Real-Address Mode Exceptions
UD                The UIRET instruction is not recognized in real-address mode.

Virtual-8086 Mode Exceptions
UD                The UIRET instruction is not recognized in virtual-8086 mode.

Compatibility Mode Exceptions
UD                The UIRET instruction is not recognized in compatibility mode.

64-Bit Mode Exceptions
GP(0)            If the return instruction pointer is non-canonical.
SS(0)            If an attempt to pop a value off the stack causes a non-canonical address to be referenced.
PF(fault-code)    If a page fault occurs.
AC(0)            If alignment checking is enabled and an unaligned memory reference is made while the current privilege level is 3.
CP                If return instruction pointer from stack and shadow stack do not match.
UD                If the LOCK prefix is used.
                     If executed inside an enclave.
                     If CR4.UINTR = 0.
                     If CPUID.07H.0H:EDX.UINTR[bit 5] = 0.

FIG. 10B

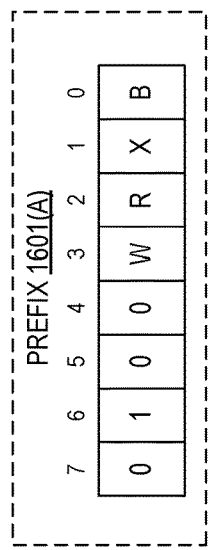
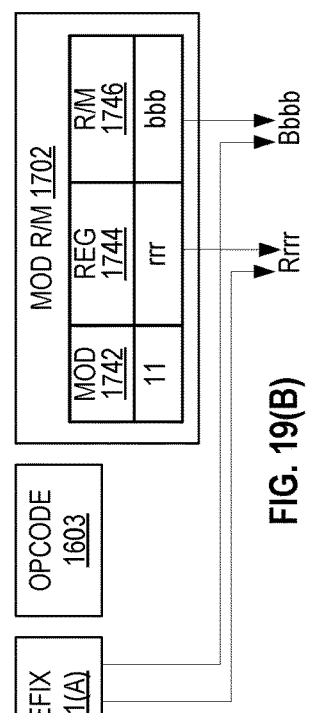
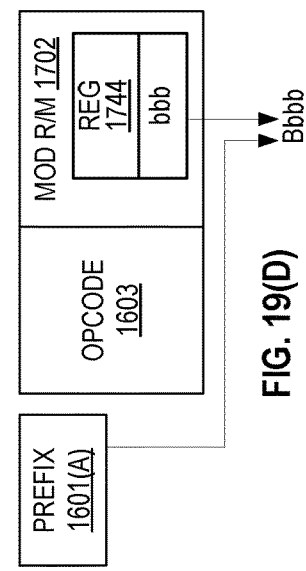
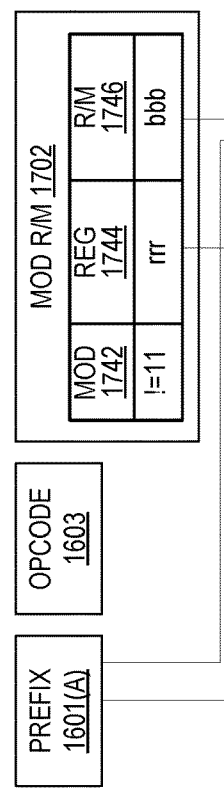
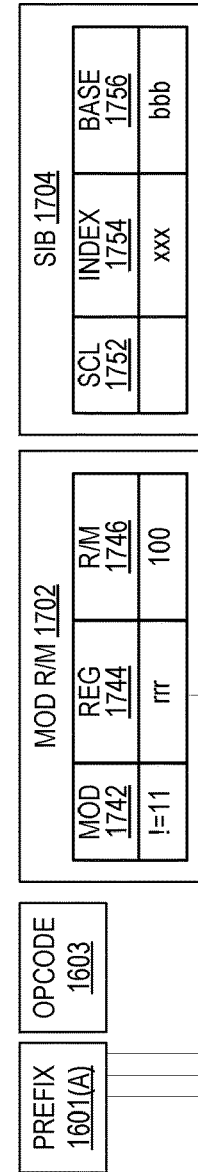
FIG. 18
FIG. 19(A)
FIG. 19(B)
FIG. 19(C)
FIG. 19(D)

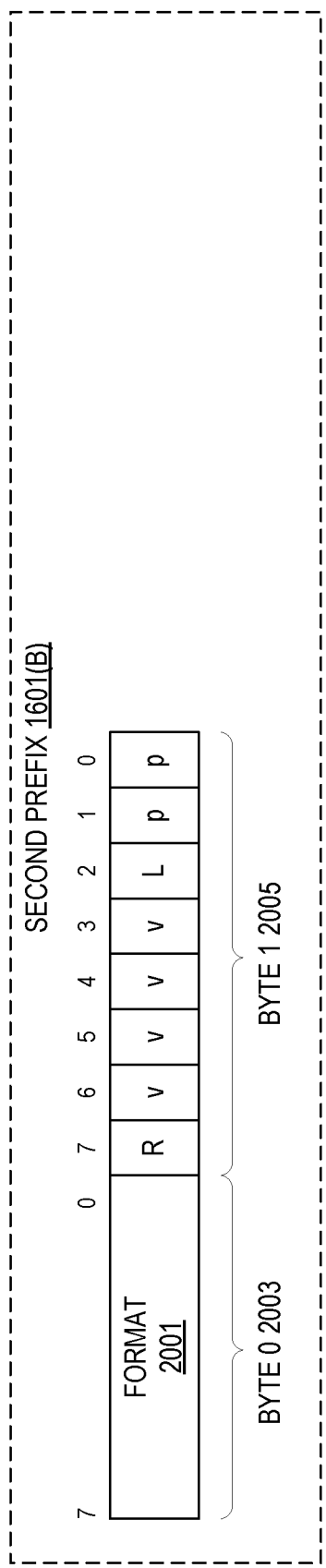
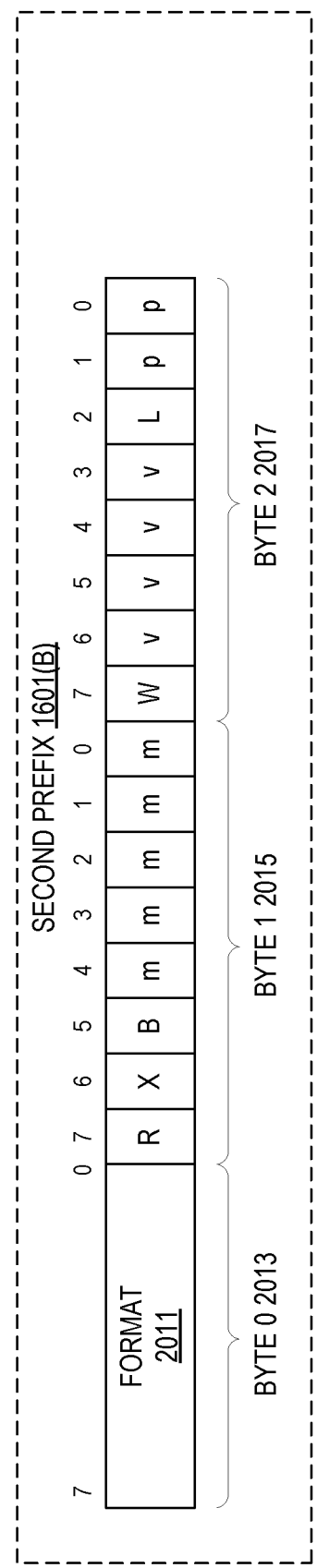
FIG. 20(A)
FIG. 20(B)

USER-LEVEL INTERPROCESSOR INTERRUPTS

FIELD OF INVENTION

The field of invention relates generally to information processing, and, more specifically, but without limitation, to processor architecture.

BACKGROUND

In computers and other information processing systems, Input/output (I/O) devices external to the central processing unit (CPU) may be managed by software modules (drivers) which operate at the kernel privilege level. Notifications from an I/O device may be delivered to the corresponding driver in the form of interrupts. Interrupts are typically delivered first to the operating system (OS) kernel, which then may pass control to an appropriate driver.

BRIEF DESCRIPTION OF DRAWINGS

Various embodiments in accordance with the present disclosure will be described with reference to the drawings, in which:

FIGS. 6, 7, 8, 9, 10A, and 10B illustrate examples of instructions according to embodiments.

FIG. 18 illustrates embodiments of a first prefix.

FIGS. 19(A)-(D) illustrate embodiments of how the R, X, and B fields of the first prefix 1601(A) are used.

FIGS. 20(A)-(B) illustrate embodiments of a second prefix.

DETAILED DESCRIPTION

Figure 1:
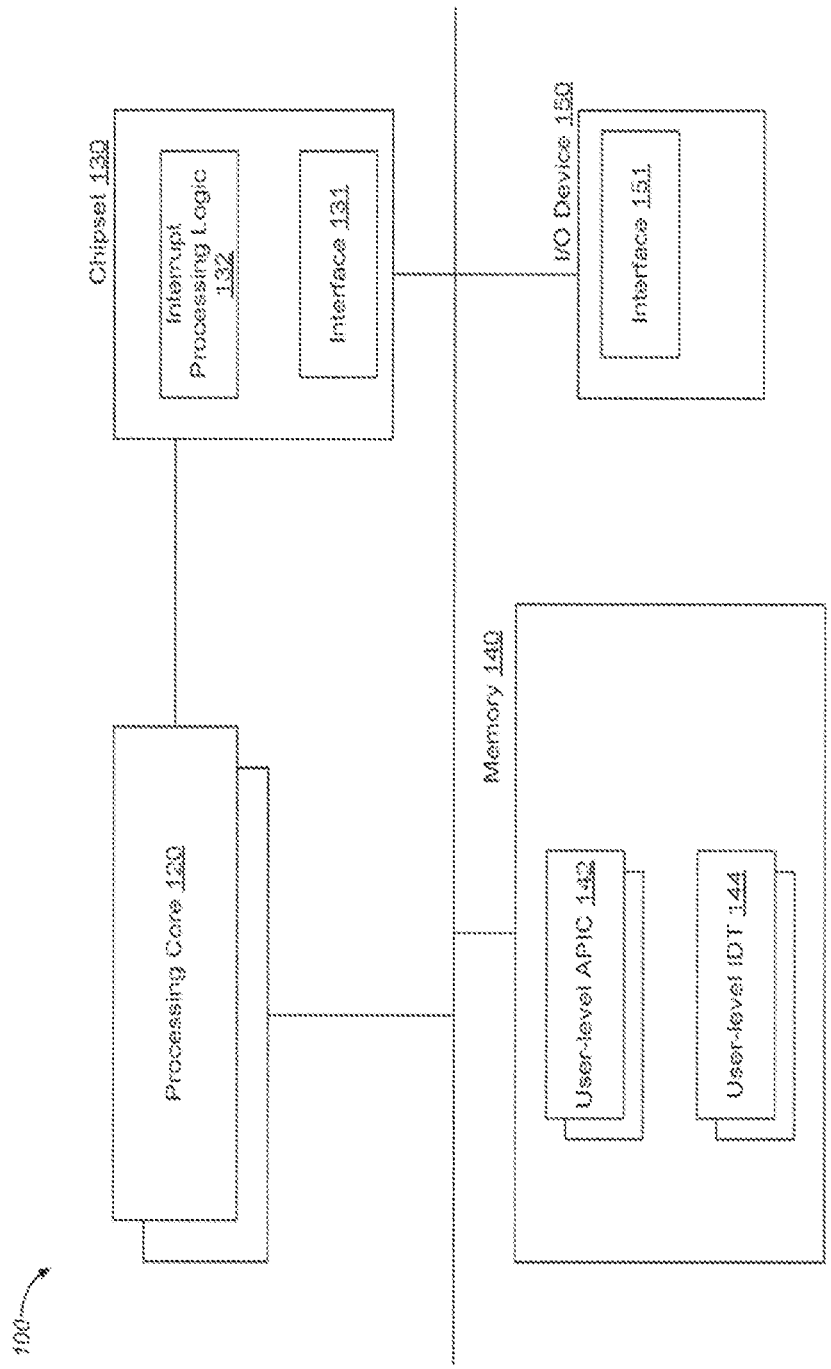
FIG. 1 depicts a high-level component diagram of an example processing system, in accordance with one or more aspects of the present disclosure.

Described herein are processing systems and related methods for delivering interprocessor interrupts to user-level applications.

In common implementations, a user-level application may interact with an I/O device via a corresponding driver executing in the kernel mode. In an illustrative example, an application may execute a system call, which causes a transition to the kernel mode. The OS kernel may process the system call by passing control to the device driver. The driver may then interact with the I/O device to perform an operation requested by the application. When the I/O device completes the operation, it may notify the application via an interrupt, which may be handled by the OS kernel and the device driver. The latter may then notify the application (e.g., by invoking a callback handler that was previously registered by the application).

Thus, the application's interaction with the I/O device may cause multiple privilege level transitions, including the system call from the application to the driver, the transition from the kernel mode back to the application after the I/O device operation has been initiated, the transition to the kernel level due to an interrupt, and the transition back to the application to invoke the application callback handler. Those transitions may result in additional latency on every interaction between a user-level application and an I/O device. Such latency may, in certain situations, exceed the operational latency of the I/O device. Thus, reducing or eliminating software latencies caused by privilege level transitions may significantly improve operational aspects of various user-level applications interacting with I/O devices.

In accordance with one or more aspects of the present disclosure, a processing system (e.g., a single-core or a multi-core processor) may comprise certain processing logic designed to support a new event, which is herein termed "user-level interrupt." Unlike an ordinary interrupt, a user-level interrupt is delivered to a corresponding user-level application without privilege level transitions and may only be delivered when such an application is being executed.

A user-level interrupt event may invoke a CPU control flow modification mechanism, which is herein termed "user-level interrupt delivery." In certain implementations, user-level interrupt delivery may be triggered based on the processor state (e.g., when a certain user-level application is being executed) and by the state of certain memory data structures that may be collaboratively managed by the processor and the operating system. These and other software-configurable mechanisms and data structures may enable the processor to deliver certain I/O interrupts directly to user-level applications without redirecting the control flow to kernel-level software, as described in more details herein below.

In certain implementations, a memory data structure, which is herein termed, by analogy with the advanced programmed interrupt controller (APIC), "user-level APIC,"

may be collaboratively managed by the processor and the operating system. A separate instance of a user-level APIC may be created for each thread of a user-level application being executed by the processor. The user-level APIC may include a bitmap comprising a plurality of bit flags. Each bit flag may indicate the status of the user-level interrupt identified by the vector corresponding to the position of the bit flag in the bit map. In an illustrative example, the processor may set a bit to indicate that the user-level interrupt identified by the vector corresponding to the position of the bit flag in the bit map is currently pending.

The operating system may further maintain another memory data structure, which is herein termed user-level interrupt handler address data structure. A separate instance of a user-level interrupt handler address data structure may be created for each thread of a user-level application being executed by the processor. In certain implementations, the user-level interrupt handler address data structure may be represented by a table comprising a plurality of addresses of user-level interrupt handlers, indexed by the interrupt vector (which is, by analogy with Interrupt Descriptor Table (IDT), termed "User-level IDT"). Alternatively, a single user-level interrupt handler address may be stored in a processor register to identify a user-level interrupt handler that would be responsible for all interrupt vectors. In the latter scenario, the user-level interrupt vector may be pushed on the stack of the interrupt handler. In the following description and claims, "user-level interrupt handler address data structure" shall refer to either the above referenced table comprising a plurality of addresses of user-level interrupt handlers or to the above referenced single user-level interrupt handler address, which may be stored either in one or more processor registers or in the system memory.

Responsive to receiving a notification of a user-level interrupt while a corresponding user-level application is being executed, the processor may notify the application by invoking a user-level interrupt handler identified by the user-level interrupt handler address data structure. When the user-level interrupt handler completes the execution, the control flow may be returned to the software module that was being executed at the time the user-level interrupt was delivered. Thus, the user-level interrupt may be delivered and processed by the user-level application without causing privilege level transitions, as described in more details herein below.

In certain implementations, the processor may prioritize the user-level interrupts, e.g., based on the interrupt vector number. In an illustrative example, responsive to receiving a notification of a user-level interrupt, the processor may set a bit corresponding to the user-level interrupt vector in the user-level APIC associated with the user-level application that is currently being executed by the processor. The processor may then invoke the user-level interrupt handler identified by the user-level interrupt handler address data structure associated with the user-level application, for a pending user-level interrupt having the highest priority among one or more pending user-level interrupts identified by the user-level APIC, as described in more details herein below.

Various aspects of the above referenced methods and systems are described in more details herein below by way of examples, rather than by way of limitation.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation in order to provide a thorough understanding of the present disclosure. It will be apparent, however, to one skilled in the art that these specific details need not be employed to practice the methods disclosed herein. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Although the following examples are described with reference to a processor, other implementations are applicable to other types of integrated circuits and logic devices. Similar techniques and teachings of examples described herein can be applied to other types of circuits or semiconductor devices that can benefit from higher pipeline throughput and improved performance. The teachings of examples described herein are applicable to any processor or machine that performs data manipulations. However, the present disclosure is not limited to processors or machines that perform 512-bit, 256-bit, 128-bit, 64-bit, 32-bit, or 16-bit data operations and can be applied to any processor and machine in which manipulation or management of data is performed.

The examples illustrating the present disclosure and accompanied drawings should not be construed in a limiting sense as they are merely intended to provide examples of embodiments described herein rather than to provide an exhaustive list of all possible implementations of embodiments described herein. Although the below examples describe instruction handling and distribution in the context of execution units and logic circuits, other implementations of the systems and methods described herein can be accomplished by way of a data or instructions stored on a machine-readable, tangible medium, which when performed by a machine cause the machine to perform functions consistent with at least one embodiment described herein. In certain implementations, functions associated with embodiments described herein are embodied in machine-executable instructions. The instructions can be used to cause a general-purpose or special-purpose processor that is programmed with the instructions to perform the methods described herein. Implementations described herein may be provided as a computer program product or software which may include a machine or computer-readable medium having stored thereon instructions which may be used to program a computer (or other electronic devices) to perform one or more operations according to embodiments described herein. Alternatively, operations of systems and methods described herein may be performed by specific hardware components that contain fixed-function logic for performing the operations, or by any combination of programmed computer components and fixed-function hardware components.

Instructions used to program logic to perform the methods described herein can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

"Processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

References to "one embodiment," "an embodiment," "example embodiment," "various embodiments," etc., indicate that the embodiment(s) described may include particular features, structures, or characteristics, but more than one embodiment may and not every embodiment necessarily does include the particular features, structures, or characteristics. Some embodiments may have some, all, or none of the features described for other embodiments. Moreover, such phrases are not necessarily referring to the same embodiment. When a particular feature, structure, or characteristic is described in connection with an embodiment, it is submitted that it is within the knowledge of one skilled in the art to effect such feature, structure, or characteristic in connection with other embodiments whether or not explicitly described.

As used in this description and the claims and unless otherwise specified, the use of the ordinal adjectives "first," "second," "third," etc. to describe an element merely indicates that a particular instance of an element or different instances of like elements are being referred to, and is not intended to imply that the elements so described must be in a particular sequence, either temporally, spatially, in ranking, or in any other manner. Also, as used in descriptions of embodiments, a "/" character between terms may mean that an embodiment may include or be implemented using, with, and/or according to the first term and/or the second term (and/or any other additional terms).

Also, the terms "bit," "flag," "field," "entry," "indicator," etc., may be used to describe any type or content of a storage location in a register, table, database, or other data structure, whether implemented in hardware or software, but are not meant to limit embodiments to any particular type of storage location or number of bits or other elements within any particular storage location. For example, the term "bit" may be used to refer to a bit position within a register and/or data stored or to be stored in that bit position. The term "clear" may be used to indicate storing or otherwise causing the logical value of zero to be stored in a storage location, and the term "cleared" may refer to the state after the storing or causing has occurred. The term "set" may be used to indicate storing or otherwise causing the logical value of one, all ones, or some other specified value to be stored in a storage location, and the term "set" may also refer to the state after the storing or causing has occurred. However, these terms are not meant to limit embodiments of the present invention to any particular logical convention, as any logical convention may be used within embodiments of the present invention.

In this specification, new and/or existing (e.g., Intel® 64 and IA-32 Architecture) names and/or acronyms may be used to provide brevity but are not intended to limit embodiments. For example, names or acronyms may be used to refer to either or both of a register (or other storage location) and/or a value/values stored, to be stored in a register, and/or read from a register (or other storage location).

Referring now to FIG. 1, shown is a block diagram of an example processing system 100 in accordance with one or more aspects of the present disclosure. As shown in FIG. 1, processing system 100 may comprise one or more processing cores 120, which may be coupled, via a shared interconnect, to system memory 140.

Processing system 100 may further comprise a chipset 130 that supports memory operations, input/output operations, configuration, control, internal or external interface, connection, or communications functions, and/or other similar functions for processing cores 120 and/or other components of processing system 100. Individual elements of chipset 130 may be grouped together on a single chip, dispersed among multiple chips, and/or be integrated partially, totally, redundantly, or according to a distributed approach into one or more processors, including processing cores 120.

In certain implementations, chipset 130 may comprise interrupt processing logic 132 which may implement user-level interrupt posting in accordance with one or more aspects of the present disclosure, as described in more details herein below. Alternatively, interrupt processing logic 132 may reside in other components of processing system 100. Various implementations of the systems and methods described herein may perform user-level interrupt delivery using unchanged or modified chipset elements that are currently used for ordinary interrupt processing.

System memory 140 may comprise one or more media on which information, such as data and/or program code, may be stored, such as static or dynamic random-access memory, semiconductor-based read-only or flash memory, magnetic or optical disk memory, or any other type of medium readable by processing cores 120.

Device 150 may comprise any type of I/O device, peripheral device, or other device that may initiate an interrupt request, such as a keyboard, mouse, trackball, pointing device, monitor, printer, media card, network interface, information storage device, etc. Device 150 may be embodied in a discrete component or may be integrated with other devices. In certain implementations, device 150 may represent a function in a multifunctional I/O, peripheral, or other device.

Processing cores 120, chipset 130, system memory 140, and device 150 may be coupled to each other directly or indirectly through one or more parallel, sequential, pipelined, asynchronous, synchronous, wired, wireless, and/or other bus or point-to-point connection or means of communication. In the illustrative example of FIG. 1, chipset 130 includes interface 131 to receive signals, messages, and/or transactions, such as interrupt requests, from device 150, or transmit signals, messages, and/or transactions to device 150 and/or any other agents or components in system 100, through any such connection or other means of communication. Similarly, device 150 includes interface 151 to transmit and/or receive signals, messages, and/or transactions to chipset 130, and/or any other agents or components of processing system 100. In certain implementations, processing system 100 may also include various other components not shown in FIG. 1.

In certain implementations, memory 140 may be utilized to store a plurality of user-level APIC data structures 142 and a plurality of user-level interrupt handler address data structures 144 associated with a plurality of user-level threads being executed by processing system 100, as described in more details herein below. Alternatively, user-level APIC data structures 142 and/or user-level interrupt handler address data structures 144 may be stored in registers of processing cores 120. The base addresses of user-level APIC data structure 142 and/or user-level interrupt handler address data structure 144 associated with a given user thread may be stored in a state or context save (e.g., XSAVE) area employed by the operating system to load the state on a context switch. In certain implementations, the processor may, on a context switch, load the base addresses of user-level APIC data structure 142 and/or user-level interrupt handler address data structure 144 stored in the XSAVE area into certain processor registers.

Ordinary interrupts are distinguished from each other by their respective unique interrupt types, or interrupt numbers, often referred to as "interrupt vectors." User-level interrupts may share the vector space with ordinary interrupts (so that every interrupt vector identifies either an ordinary interrupt or a user-level interrupt), or they may be allocated a dedicated user-level interrupt vector space. Separating the vector spaces allow independent prioritization of user-level interrupts by each user-level application, thus facilitating dynamic migration of user threads across processing cores.

Figure 2:
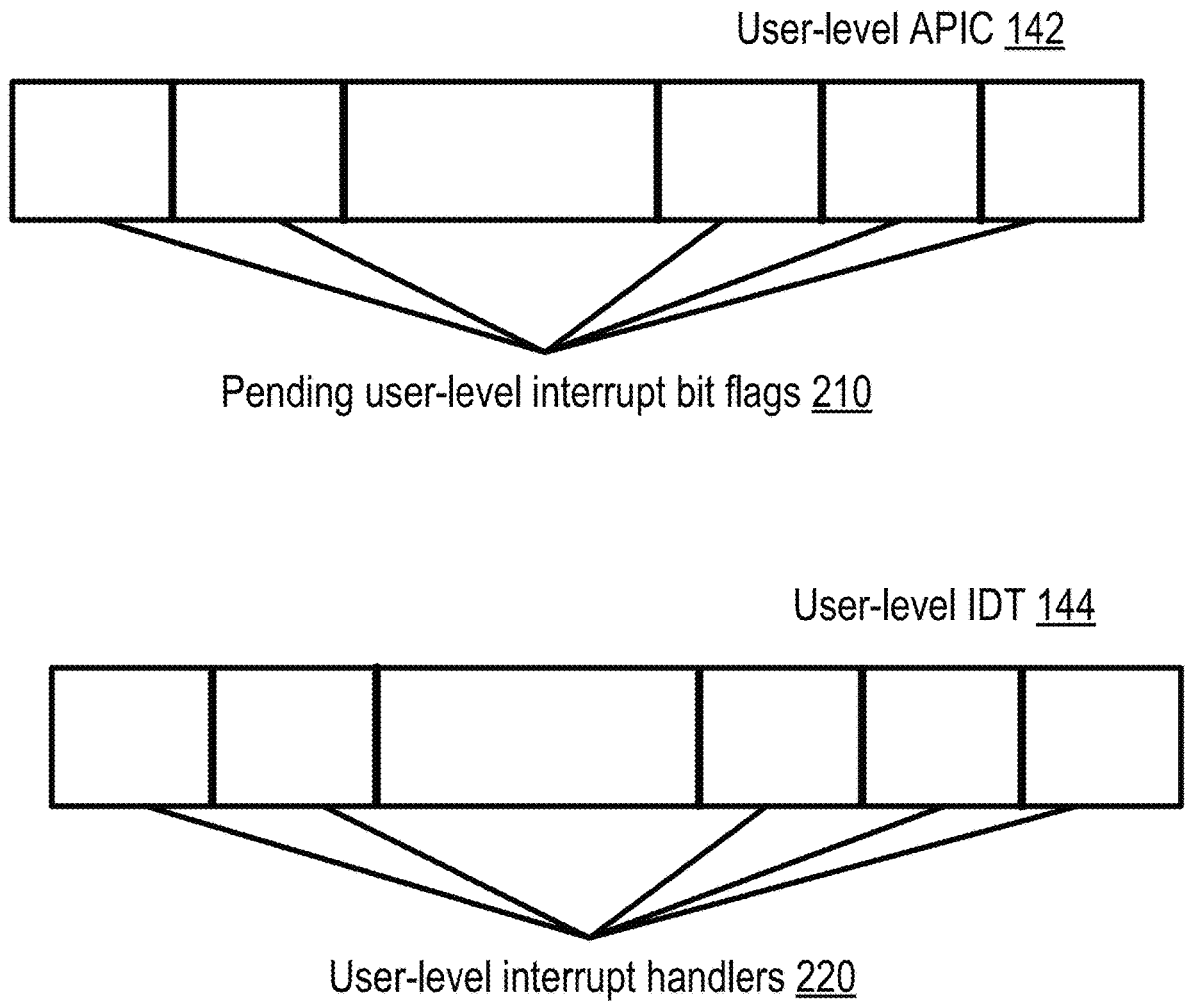
FIG. 2 schematically illustrates an example user-level interrupt controller data structure and an example of user-level interrupt handler address data structure associated with a user-level thread, in accordance with one or more aspects of the present disclosure.

A processor may be configured to track pending user-level interrupts using a plurality of user-level APIC data structures 142 associated with a plurality of user-level threads being executed by the processor, as schematically illustrated by FIG. 2. Each user-level APIC data structure 142 may include a bitmap comprising plurality of bit flags 210. The position of each bit flag within the bitmap may correspond to an interrupt number identifying the user-level interrupt type to be processed by the user-level application associated with the user-level APIC data structure. Responsive to receiving a notification of one or more user-level interrupts (e.g., in the form of one or more bits set in the posted interrupt descriptor, as described in more details herein below), the processor may set one or more bits corresponding to the user-level interrupt vectors in the user-level APIC data structure associated with the user-level application that is currently being executed by the processor. The base address of a user thread's user-level APIC data structure may be stored in that thread's XSAVE area.

In certain implementations, the processor may maintain a software-controlled masking bit for user-level interrupts. A certain value of this bit may prevent the processor from delivering any user-level interrupts until the bit value is changed. In an illustrative example, the processor may set the masking bit to mask user-level interrupts as part of the user-level interrupt delivery procedure that is described in more details herein below. Conversely, the user-level interrupt handler (or the instruction that returns the flow control from the user-level interrupt handler) may clear the bit to allow the user-level interrupt delivery. The masking bit may reside in an existing processor register or in a newly defined processor register. The processor may support new instructions to allow reading and writing of the bit, either individually or as a part of the register in which the bit resides.

In certain implementations, the processor may prioritize the user-level interrupts that have not yet been delivered, e.g., based on the interrupt vector number. In an illustrative example, priorities may be associated with interrupt vector numbers in the ascending order, so that the lowest priority is given to the lowest vector number, the second priority is given to the second lowest vector number, and the highest priority is given to the highest vector number. The processor may select for delivery a pending user-level interrupt having the highest priority among one or more pending user-level interrupts identified by the user-level APIC bits.

In addition to tracking pending user-level interrupts, the processor may, in certain implementations, track the interrupts that have been delivered but are still being serviced by the software. In this case, the processor may deliver a user-level interrupt only if its vector number exceeds the highest vector number of the interrupts that are currently being serviced. To facilitate this user-level interrupt delivery mode, the processor may support a mechanism (e.g., implemented by a new instruction and/or a new register) by which the software may indicate the completion of user-level interrupt servicing. In addition, the processor may support a mechanism by which the software may limit the types of user-level interrupts to be delivered (e.g., by indicating the lowest vector that should be delivered).

The processor may then identify the interrupt handler associated with the selected highest priority interrupt, by looking up the user-level interrupt handler address in the user-level interrupt handler address data structure associated with the user-level application. The base address of a user thread's user-level interrupt handler address data structure may be stored in that thread's XSAVE area. In certain implementations, the user-level interrupt handler address data structure may be represented by a table 144 comprising a plurality of addresses of user-level interrupt handlers 220, indexed by the interrupt vector, as schematically illustrated by FIG. 2. Alternatively, the user-level interrupt handler address data structure may comprise the address of a single user-level interrupt handler that would be responsible for all interrupt vectors.

The processor may then invoke the identified user-level interrupt handler. In an illustrative example, the processor may then store on the stack the current value of the Instruction Pointer (IP) and load the identified user-level interrupt handler address into the IP. When invoking the identified user-level interrupt handler, the processor may also set the masking bit for user-level interrupts to mask user-level interrupts; the processor register containing this masking bit may be among those that the processor earlier stored on the stack. The user-level interrupt handler may save, in memory or on the stack, values of one or more components of CPU state (e.g., processor registers). The user-level interrupt handler may comprise a plurality of instructions designed to process the pending interrupt (e.g., copy certain data from a memory buffer associated with an I/O device into a memory buffer allocated by the application, or vice versa). The user-level interrupt handler may complete by restoring the saved CPU state executing a return (e.g., RET) instruction that loads the IP with the address that is stored on the top of the stack, thus passing the control flow to the instruction following the one that had been executed instruction before the user-level interrupt was delivered. In certain implementations, flow control return from the user-level interrupt handler may be performed by using an existing return instruction. Alternatively, a new instruction may be added to the instruction set for effectuating flow control return from a user-level interrupt handler. Such a new instruction may clear the masking bit for user-level interrupts to unmask user-level interrupts; alternatively, it may load from the stack the processor register containing this masking bit. In various illustrative examples, other mechanisms of invoking the identified interrupt handler may be employed.

In certain implementations, notifications from I/O devices may be explicitly marked as user-level interrupts as such notifications are transmitted through the platform hardware (e.g., chipset 130 or processor uncore) to the CPU. Alternatively, the notifications may be implemented through ordinary interrupt messages with ordinary interrupt vectors.

The processor may determine which interrupts should be treated as user-level interrupts based on the vector number or some other property. In an illustrative example, the operating system may maintain a table having a plurality of entries corresponding to the plurality of ordinary interrupt vectors. Each entry of the interrupt mapping table may comprise a bit flag indicating whether the processor should convert the corresponding interrupt into a user-level interrupt. In certain implementations, each entry of the interrupt mapping table may further comprise the user-level interrupt vector that should be used for the corresponding interrupt delivery. Alternatively, the processor may keep the vector of the ordinary interrupt when delivering a user-level interrupt in response to receiving an ordinary interrupt message. In certain implementations, an interrupt request may be identified as a kernel interrupt or user-level interrupt, allowing it to be processed independently through separate interrupt mapping tables. In another implementation, an interrupt request may be processed through a common interrupt mapping table, where the entry used to map the interrupt request is programmed to specify if the interrupt request is to be processed as a kernel interrupt or user-level interrupt.

Figure 3:
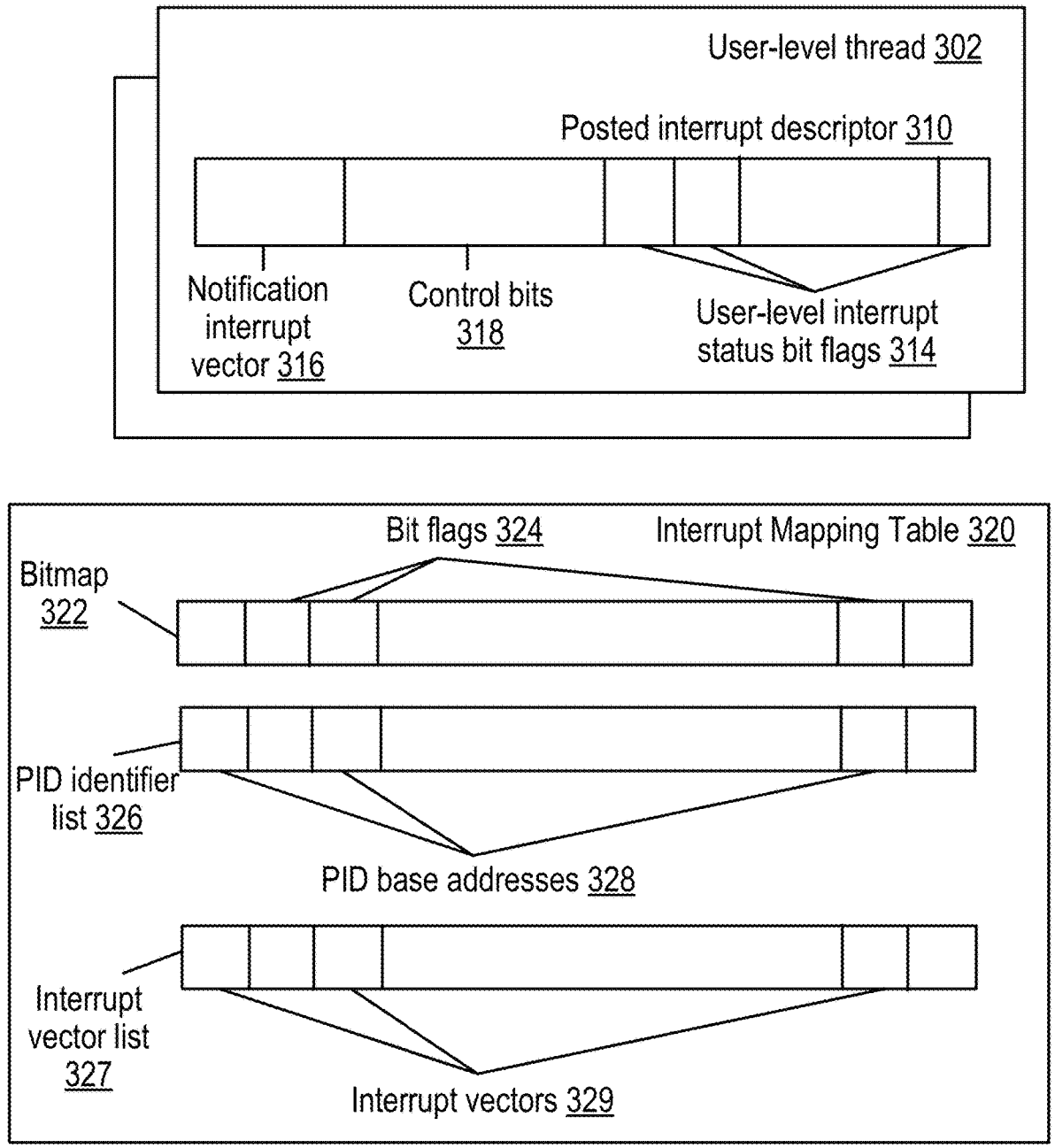
FIG. 3 schematically illustrates example data structures employed by example methods of posting user-level interrupts by the platform hardware, in accordance with one or more aspects of the present disclosure.

In certain implementations, the platform hardware (e.g., chipset 130 or processor uncore) may process an interrupt from an I/O device by recording information about the interrupt in a memory data structure associated with the user-level application associated with the incoming interrupt vector. As schematically illustrated by FIG. 3, for each user thread 302 that may receive user-level interrupts, the operating system may create and maintain a memory data structure 310 which is herein termed "posted interrupt descriptor". Posted interrupt descriptor 310 may include a bitmap comprising a plurality of bit flags 314. Each bit flag 314 may indicate the status of the user-level interrupt identified by the vector corresponding to the position of the bit flag in the bit map. In an illustrative example, the platform hardware may set a bit corresponding to a pending user-level interrupt vector.

Posted interrupt descriptor 310 may further comprise a notification interrupt vector 316 identifying the ordinary interrupt that the platform hardware may employ to notify the processor of pending user-level interrupts, as described herein below. Posted interrupt descriptor 310 may further comprise one or more control bits 318 that may be used by the software and/or other agents of the processing system.

The operating system may further create and maintain an interrupt mapping table 320 including a bitmap 322 comprising a plurality of bit flags 324. Each bit flag 324 may indicate whether the processor should convert the interrupt from an interrupt source identified by the position of the bit flag within bitmap 322 into a user-level interrupt. Interrupt mapping table 320 may further comprise a list 326 of identifiers (e.g., base addresses) 328 of posted interrupt descriptors. Each posted interrupt descriptor may be associated with the user thread that is associated with the source of the ordinary interrupt identified by the position of the posted interrupt descriptor within list 326.

In certain implementations, interrupt mapping table 320 may further comprise a list 327 of interrupt vectors 329 that should be used for the corresponding user-level interrupt delivery. Alternatively, the processor may keep the vector of the ordinary interrupt when delivering a user-level interrupt in response to receiving an ordinary interrupt message.

Responsive to receiving an interrupt from an I/O device, the platform hardware may look up the interrupt source identifier (e.g., represented by the device number) in interrupt mapping table 320. If the bit flag 324 associated with the interrupt source indicates that the interrupt should be processed as a user-level interrupt, the platform hardware may retrieve, from interrupt mapping table 320, the base address 328 of posted interrupt descriptor 310 associated with the interrupt source. The platform hardware may then set, in posted interrupt descriptor, the bit flag 314 indicating that the corresponding user-level interrupt is pending. Bit flag 314 will then be cleared by the processor to acknowledge the receipt of the posted interrupt. Upon setting bit flag 314, the platform hardware may transmit to the processor a notification interrupt having the vector identified by notification interrupt vector field 316 of posted interrupt descriptor 310.

Responsive to receiving an interrupt, the processor may compare the interrupt vector with the notification interrupt vector of the user thread that is currently being executed by the processor. In an illustrative example, the notification interrupt vector of the current user thread may be identified by the posted interrupt descriptor 310. Alternatively, the notification interrupt vector of the current user thread may be identified by a control register that is programmable by the operating system. Responsive to determining that the incoming interrupt is not a notification interrupt, the processor may deliver the incoming interrupt using the common interrupt delivery mechanism (e.g., passing the control flow to the interrupt handler identified by IDT lookup). Alternatively, responsive to determining that the incoming interrupt vector matches the notification interrupt vector, the processor may process the posted user-level interrupts.

Processing of posted user-level interrupts may comprise reading, by the processor, bit flags 314 of posted interrupt descriptor 310 associated with the current user thread. The processor may set, in user-level APIC data structure 142 associated with the current user thread, bit flags 210 at the positions of the set bit flags 314 of posted interrupt descriptor 310. The processor may then trigger a micro-architectural event to indicate the presence of a pending user-level interrupt. Responsive to detecting the micro-architectural event, the processor may select the highest priority user-level interrupt for delivery, identify the interrupt handler for the selected user-level interrupt by looking up the user-level interrupt handler address data structure, and invoke the identified interrupt handler, as described in more details herein below with reference to FIG. 5B.

Figure 4:
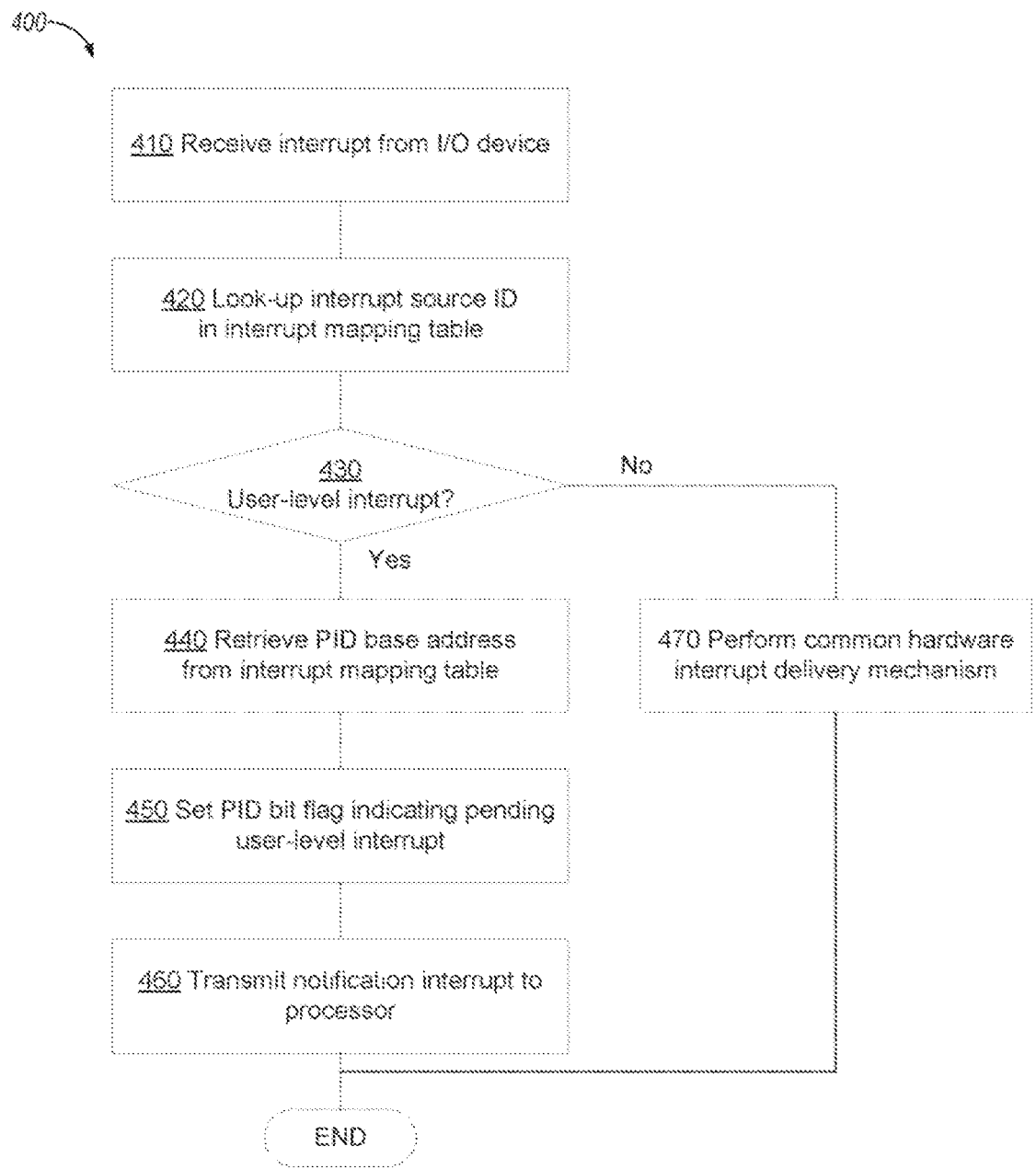
FIG. 4 depicts a flow diagram of an example method for posting user-level interrupts by the platform hardware, in accordance with one or more aspects of the present disclosure.

FIG. 4 depicts a flow diagram of an example method for posting user-level interrupts by the platform hardware, in accordance with one or more aspects of the present disclosure. Method 400 may be performed by a computer system that may comprise hardware (e.g., circuitry, dedicated logic, and/or programmable logic), software (e.g., instructions executable on a computer system to perform hardware simulation), or a combination thereof. Method 400 and/or each of its functions, routines, subroutines, or operations may be performed by one or more physical processors and/or other components of the computer system executing the method. In one example, as illustrated by FIG. 4, method 400 may be performed by the processing systems described herein below and illustrated by FIGS. 6-12.

Referring to FIG. 4, at block 410, the platform hardware implementing the method may receive an interrupt from an I/O device.

At block 420, the platform hardware may look up the interrupt source identifier (e.g., represented by the device number) in the interrupt mapping table that is managed by the operating system to indicate to the platform hardware which interrupts should be treated as user-level interrupts, as described in more details herein above.

Responsive to determining, at block 430, that the bit flag associated with the interrupt source indicates that the interrupt should be processed as a user-level interrupt, the processing may continue at block 440; otherwise, the method may branch to block 470 to perform the common hardware interrupt delivery mechanism.

At block 440, the platform hardware may retrieve, from the interrupt mapping table, the base address of the posted interrupt descriptor associated with the interrupt source, as described in more details herein above.

At block 450, the platform hardware may set, in the posted interrupt descriptor, the bit flag indicating that the corresponding user-level interrupt is pending.

At block 460, the platform hardware may transmit to the processor a notification interrupt having the vector identified by the notification interrupt vector field of the posted interrupt descriptor, as described in more details herein above, and the method may terminate.

Figure 5A:
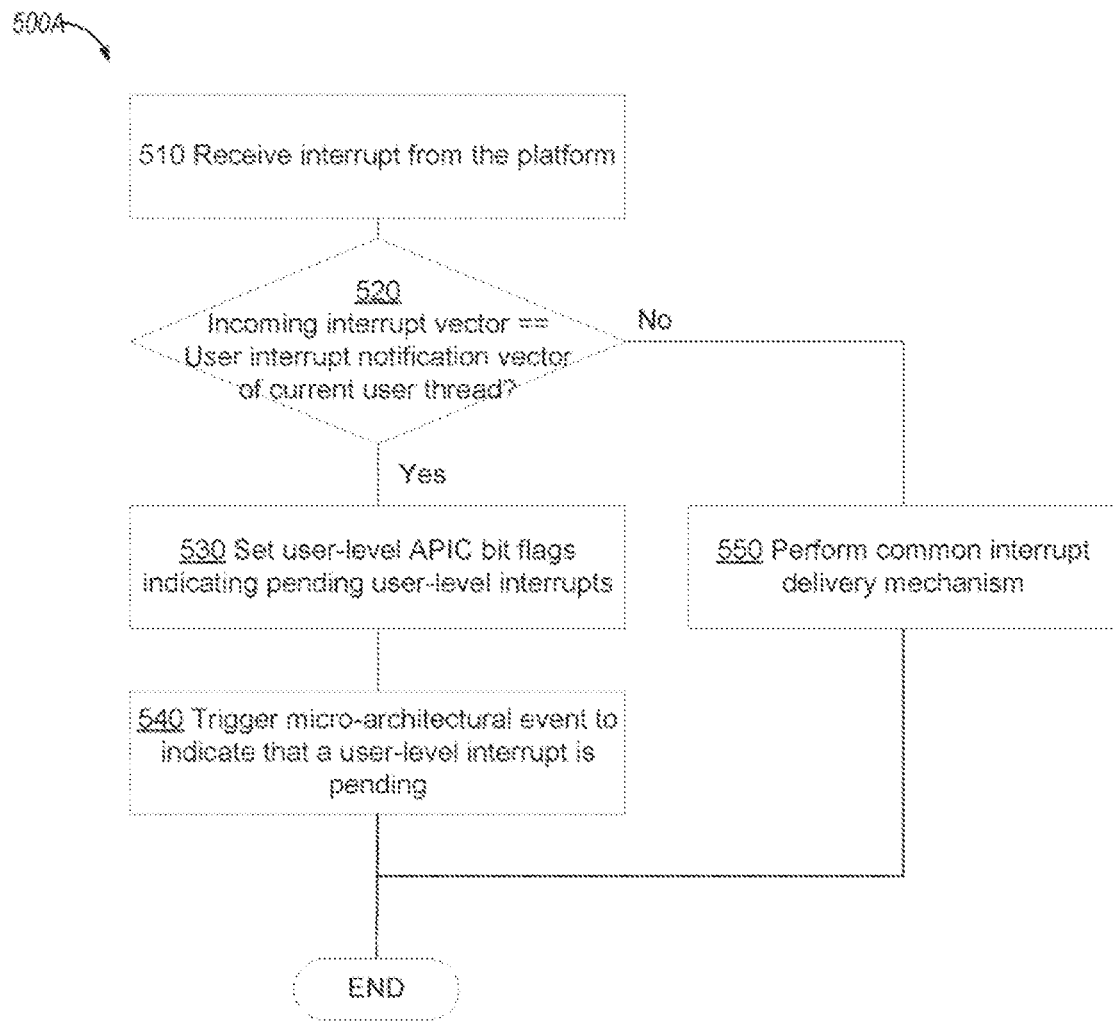
FIGS. 5A-5B depict flow diagrams of example methods for delivering interrupts to user-level applications, in accordance with one or more aspects of the present disclosure.
Figure 5B:
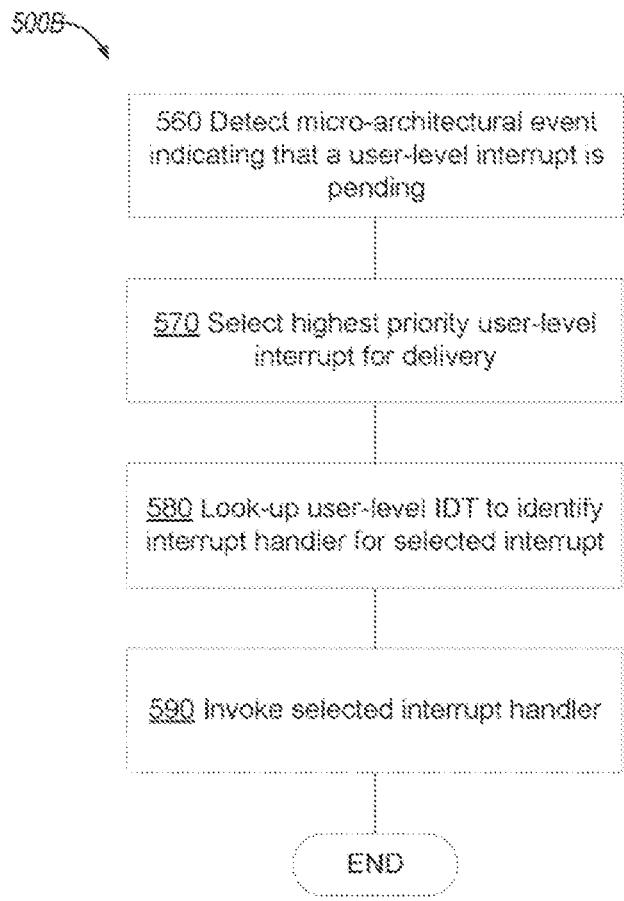

FIGS. 5A-5B depict flow diagrams of example methods for delivering interrupts to user-level applications, in accordance with one or more aspects of the present disclosure. In particular, method 500A illustrates processing of a notification interrupt, and method 500B illustrates the user-level interrupt delivery. Methods 500A-500B may be performed by a computer system that may comprise hardware (e.g., circuitry, dedicated logic, and/or programmable logic), software (e.g., instructions executable on a computer system to perform hardware simulation), or a combination thereof. Methods 500A-500B and/or each of their functions, routines, subroutines, or operations may be performed by one or more physical processors and/or other components of the computer system executing the method. In one example, as illustrated by FIGS. 5A-5B, methods 500A-500B may be performed by the processing systems described herein below and illustrated by FIGS. 6-12.

Referring to FIG. 5A, at block 510, the processor implementing the method may receive an interrupt from the platform.

Responsive to determining, at block 520, that the incoming interrupt vector matches the notification interrupt vector of the current user thread, the processing may continue at block 530; otherwise, the method may branch to block 550 to perform the common interrupt delivery mechanism.

At block 530, the processor may set, in the user-level APIC data structure associated with the current user thread, bit flags at the positions of the set bit flags of the posted interrupt descriptor associated with the current user thread, as described in more details herein above.

At block 540, the processor may, based on the state of the user-level APIC, trigger a micro-architectural event to indicate the presence of a pending user-level interrupt, in order to trigger method 500B for the delivery of the pending user-level interrupt.

Method 500B illustrates the user-level interrupt delivery. The method may be triggered by the micro-architectural event caused by method 500A to indicate the presence of a pending user-level interrupt. Thus, method 500B may invoked at some point in time after the micro-architectural event was asserted, depending on several conditions, including, e.g., whether the user-level interrupts are masked and whether the current privilege level allows user-level interrupt processing.

At block 560, the processor may detect a micro-architectural event indicating the presence of a pending user-level interrupt.

At block 570, the processor may select for delivery a pending user-level interrupt having the highest priority among one or more pending user-level interrupts identified by the user-level APIC bits, as described in more details herein above.

At block 580, the processor may identify the interrupt handler associated with the selected highest priority interrupt, by looking up the interrupt handler address in the user-level interrupt handler address data structure associated with the user-level application, as described in more details herein above.

At block 590, the processor may invoke the identified user-level interrupt handler, as described in more details herein above, and the method may terminate.

Examples detailed herein relate to an architectural feature called user interrupts. This feature defines user interrupts as events. User interrupts are delivered to software operating in an unprivileged/user mode (e.g., in 64-bit mode with a current privilege level (CPL) of 3) without a change to a segmentation state. Different user interrupts are distinguished by a user-interrupt vector (e.g., a 6-bit vector), which is pushed on a stack as part of user-interrupt delivery. In some examples, the execution of a user-interrupt return (UIRET) instruction reverses user-interrupt delivery.

The user-interrupt architecture is configured in some examples by a supervisor-managed state. This state includes a plurality of model (or machine) specific registers (MSRs). In expected usages, an operating system (OS) will update the content of these MSRs when switching between OS-managed threads.

One of the MSRs references a data structure called the user posted-interrupt descriptor (UPID). User interrupts for an OS-managed thread can be posted in the UPID associated with that thread. Such user interrupts will be delivered after receipt of an ordinary interrupt (also identified in the UPID) called a user-interrupt notification.

System software can define operations to post user interrupts and to send user-interrupt notifications. In addition, in some examples, an instruction, SENDUIPI, allows application software to send inter-processor user interrupts (user IPIs). An execution of SENDUIPI posts a user interrupt in a UPID and sends a user interrupt notification.

Enumeration and Enabling

In some examples, user interrupts are enabled by setting a bit (e.g., bit 25 (UINTR)) in a control register (e.g., CR4). Setting CR4.UINTR enables user-interrupt delivery, user-interrupt notification identification, and user interrupt instructions. It may not affect the accessibility of the user-interrupt MSRs by read MSR (RDMSR), write MSR (WRMSR), or context save (XSAVE) feature sets.

Processor support for user interrupts is enumerated, in some examples, by CPUID.(EAX=7,ECX=0):EDX[5]. If this bit is set, software can set CR4.UINTR to 1 and can access the user-interrupt MSRs using RDMSR and WRMSR.

In some examples, the user-interrupt feature is XSAVE-managed.

User-Interrupt State and User-Interrupt MSRs

In some examples, the user-interrupt architecture defines the following state. Some of this state can be accessed via the RDMSR and WRMSR instructions (such as through user-interrupt MSR) and some can be accessed using instructions described herein.

User-Interrupt State

In embodiments, the following are the elements of the user-interrupt state (enumerated here independently of how they are accessed):

UIRR: user-interrupt request register. This value includes one bit for each of 64 user-interrupt vectors. If UIRR[i]=1, a user interrupt with vector i is requesting service. The notation UIRRV is used to refer to the position of the most significant bit set in UIRR; if UIRR=0, UIRRV=0.

UIF: user-interrupt flag. If UIF=0, user-interrupt delivery is blocked; if UIF=1, user interrupts may be delivered. User-interrupt delivery clears UIF, and the new UIRET instruction sets it.

UIHANDLER: user-interrupt handler. This is the linear address of the user-interrupt handler. User-interrupt delivery loads this address into RIP.

UISTACKADJUST: user-interrupt stack adjustment. This value controls adjustment to the stack pointer (RSP) prior to user-interrupt delivery. It can account for an OS application binary interface's (ABI's) "red zone" or be configured to load RSP with an alternate stack pointer. If bit 0 is 1, user-interrupt delivery loads RSP with UISTACKADJUST; otherwise, it subtracts UISTACK-ADJUST from RSP. Either way, user-interrupt delivery then aligns RSP to a 16-byte boundary.

UINV: user-interrupt notification vector. This is the vector of those ordinary interrupts that are treated as user-interrupt notifications. When the logical processor receives user-interrupt notification, it processes the user interrupts in the user posted-interrupt descriptor (UPID) referenced by UPIDADDR.

UPIDADDR: user posted-interrupt descriptor address. This is the linear address of the UPID that the logical processor consults upon receiving an ordinary interrupt with vector UINV.

UITTADDR: user-interrupt target table address. This is the linear address of user-interrupt target table (UITT), which the logical processor consults when software invokes the SENDUIPI instruction.

UITTSZ: user-interrupt target table size. This value is the highest index of a valid entry in the UITT.

User-Interrupt MSRs

In embodiments, some of the state elements identified can be accessed as user-interrupt MSRs using the RDMSR and WRMSR instructions:

IA32_UINTR_RR MSR (MSR address 985H). This MSR is an interface to UIRR (64 bits).

IA32_UINTR_HANDLER MSR (MSR address 986H). This MSR is an interface to the UIHANDLER address.

IA32_UINTR_STACKADJUST MSR (MSR address 987H). This MSR is an interface to the UISTACKAD-JUST value.

IA32_UINTR_MISC MSR (MSR address 988H). This MSR is an interface to the UITTSZ and UINV values. The MSR has the following format in some examples:

bits 31:0 are UITTSZ; bits 39:32 are UINV; and bits 63:40 are reserved. Because this MSR will share an 8-byte portion of the XSAVE area with UIF, bit 63 of the MSR is reserved.

IA32_UINTR_PD MSR (MSR address 989H). This MSR is an interface to the UPIDADDR address.

IA32_UINTR TT MSR (MSR address 98AH). This MSR is an interface to the UITTADDR address (in addition, bit 0 enables SENDUIPI).

Evaluation and Delivery of User Interrupts

In embodiments, a processor determines whether there is a user interrupt to deliver based on UIRR. Once a logical processor has recognized a pending user interrupt, it will deliver it on a subsequent instruction boundary by causing a control-flow change asynchronous to software execution.

User-Interrupt Recognition

There is a user interrupt pending whenever UIRR does not equal 0.

Any instruction or operation that modifies UIRR updates the logical processor's recognition of a pending user interrupt. The following instructions and operations may need to do this:

WRMSR to the IA32_UINTR_RR MSR.
XRSTORS of the user-interrupt state component.
User-interrupt delivery.
User-interrupt notification processing.
VMX transitions that load the IA32_UINTR_RR MSR.

Each of these instructions or operations results in recognition of a pending user interrupt if it completes with UIRR not equal to 0; if it completes with UIRR=0, no pending user interrupt is recognized. Once recognized, a pending user interrupt may be delivered to software.

User-Interrupt Delivery

If CR4.UINTR=1 and a user interrupt has been recognized, it will be delivered at an instruction boundary when, in some examples, the following conditions all hold: (1) UIF=1; (2) there is no blocking by MOV SS or by POP SS; (3) CPL=3; (4) IA32_EFER.LMA=CS.L=1 (the logical processor is in 64-bit mode); and (5) software is not executing inside a protected container (e.g., an enclave).

User-interrupt delivery has priority just below that of ordinary interrupts. It wakes a logical processor from the states entered using the TPAUSE and UMWAIT instructions; it does not wake a logical processor in the shutdown state or in the wait-for-SIPI state.

User-interrupt delivery does not change CPL (it occurs entirely with CPL=3). The following pseudocode provide an example of user-interrupt delivery:

```
IF UIHANDLER is not canonical in current paging mode
    THEN #GP(0);
FI;
tempRSP := RSP;
IF UISTACKADJUST[0] = 1
    THEN RSP := UISTACKADJUST;
    ELSE RSP := RSP − UISTACKADJUST;
FI;
RSP := RSP & ~FH;   // force the stack to be 16-byte aligned
Push tempRSP;
Push RFLAGS;
Push RIP;
Push UIRRV;  // 64-bit push; upper 58 bits pushed as 0
IF shadow stack is enabled for CPL = 3
THEN ShadowStackPush RIP;
FI;
IF end-branch is enabled for CPL = 3
    THEN IA32_U_CET.TRACKER := WAIT_FOR_ENDBRANCH;
FI;
UIRR[Vector] := 0;
```

-continued

```
IF UIRR = 0
    THEN cease recognition of any pending user interrupt;
FI;
UIF := 0;
RFLAGS.TF := 0;
RFLAGS.RF := 0;
RIP := UIHANDLER;
```

If UISTACKADJUST[0]=0, user-interrupt delivery decrements RSP by UISTACKADJUST; otherwise, it loads RSP with UISTACKADJUST. In either case, user-interrupt delivery aligns RSP to a 16-byte boundary by clearing RSP[3:0].

User-interrupt delivery that occurs during transactional execution causes transactional execution to abort and a transition to a non-transactional execution. The transactional abort loads EAX as it would have, had it been due to an ordinary interrupt. User-interrupt delivery occurs after the transactional abort is processed.

The stack accesses performed by user-interrupt delivery may incur faults (page faults, or stack faults due to canonicality violations). RSP is restored to its original value before such a fault is delivered (memory locations above the top of the stack may have been written). If such a fault produces an error code that uses the EXT bit, that bit will be cleared to 0.

If such a fault occurs, UIRR is not updated and UIF is not cleared and, as a result, the logical processor continues to recognize that a user interrupt is pending and user-interrupt delivery will normally recur after the fault is handled.

If a shadow-stack feature of control-flow enforcement technology (CET) is enabled for CPL=3, user-interrupt delivery pushes the return instruction pointer onto the shadow stack. If an indirect-branch-tracking feature of CET is enabled, user-interrupt delivery transitions the indirect branch tracker to the WAIT_FOR_ENDBRANCH state; an ENDBR64 instruction is expected as the first instruction of the user-interrupt handler.

User-interrupt delivery can be tracked by one or more of Architectural Last Branch Records (LBRs), Processor Trace (PT), and Performance Monitoring. For both PT and LBRs, user-interrupt delivery is recorded in the same manner as ordinary interrupt delivery. Hence for LBRs, user interrupts fall into the OTHER_BRANCH category, which implies that IA32 LBR_CTL.OTHER_BRANCH[bit 22] is set to record user-interrupt delivery, and that the IA32 LBR_x_ INFO.BR TYPE field will indicate OTHER_BRANCH for any recorded user interrupt. For Intel PT, control flow tracing is enabled by setting IA32 RTIT_CTL.BranchEn[bit 13].

User-interrupt delivery will also increment performance counters for which counting BR_INST_RETIRED.FAR_BRANCH is enabled. Some implementations may have dedicated events for counting user-interrupt delivery.

User-Interrupt Notification Identification and Processing

User-interrupt posting is the process by which a platform agent (or software operating on a CPU) records user interrupts in a user posted-interrupt descriptor (UPID) in memory. The platform agent (or software) may send an ordinary interrupt (called a user-interrupt notification) to the logical processor on which the target of the user interrupt is operating.

A UPID may have a format as shown in Table 1:

TABLE 1

| Bit Position | Name | Description |
| --- | --- | --- |
| 0 | Outstanding notification | If this bit is set, there is a notification outstanding for one or more user interrupts in PIR. |
| 1 | Suppress notification | If this bit is set, agents (including SENDUIPI) should not send notifications when posting user interrupts in this descriptor. |
| 15:2 | Reserved | User-interrupt notification processing ignores these bits; must be zero for SENDUIPI. |
| 23:16 | Notification vector | Used by SENDUIPI. |
| 31:24 | Reserved | User-interrupt notification processing ignores these bits; must be zero for SENDUIPI. |
| 63:32 | Notification destination | Target physical APIC ID - used by SENDUIPI. In xAPIC mode, bits 47:0 are the 8-bit APIC ID. In x2APIC mode, the entire field form the 32-bit APIC ID. |
| 127:64 | Posted-interrupt requests (PIR) | One bit for each user-interrupt vector. There is a user-interrupt request for a vector if the corresponding bit is 1. |

The notation PIR (posted-interrupt requests) refers to the 64 posted-interrupt requests in a UPID.

If an ordinary interrupt arrives while CR4.UINTR=IA32_EFER.LMA=1, the logical processor determines whether the interrupt is a user-interrupt notification. This process is called user-interrupt notification identification.

Once a logical processor has identified a user-interrupt notification, it copies user interrupts in the UPID's PIR into UIRR. This process is called user-interrupt notification processing.

A logical processor is not interruptible during either user-interrupt notification identification or user-interrupt notification processing or between those operations (when they occur in succession).

User-Interrupt Notification Identification

If CR4.UINTR=IA32_EFER.LMA=1, a logical processor performs user-interrupt notification identification when it receives an ordinary interrupt. The following method provides an example of a response by a processor to an ordinary interrupt when CR4.UINTR=IA32_EFER.LMA=1:

The local APIC is acknowledged; this provides the processor core with an interrupt vector, V.

If V=UINV, the logical processor continues to the next action. Otherwise, an interrupt with vector V is delivered normally through the IDT; the remainder of this method does not apply and user-interrupt notification does not occur.

The processor writes zero to the EOI register in the local APIC; this dismisses the interrupt with vector V=UINV from the local APIC.

User-interrupt notification identification involves acknowledgment of the local APIC and thus occurs only when ordinary interrupts are not masked.

If user-interrupt notification identification completes the third action, the logical processor then performs user-interrupt notification processing.

An ordinary interrupt that occurs during transactional execution causes the transactional execution to abort and transition to a non-transactional execution. This occurs before user-interrupt notification identification.

An ordinary interrupt that occurs while software is executing inside a protected contained (e.g., an enclave) causes an asynchronous enclave exit (AEX). This AEX occurs before user-interrupt notification identification.

User-Interrupt Notification Processing

Once a logical processor has identified a user-interrupt notification, it performs user-interrupt notification processing using the UPID at the linear address in the IA32_UINTR_PD MSR.

The following method provides an example of user-interrupt notification processing:
  The logical processor clears the outstanding-notification bit (bit 0) in the UPID. This is done atomically so as to leave the remainder of the descriptor unmodified (e.g., with a locked AND operation).
  The logical processor reads PIR (bits 127:64 of the UPID) into a temporary register and writes all zeros to PIR. This is done atomically so as to ensure that each bit cleared is set in the temporary register (e.g., with a locked XCHG operation).
  If any bit is set in the temporary register, the logical processor sets in UIRR each bit corresponding to a bit set in the temporary register (e.g., with an OR operation) and recognizes a pending user interrupt (if it has not already done so).

In some examples, the logical processor performs the actions above in an uninterruptible manner. The first two actions may be combined into a single atomic step. If the third action leads to recognition of a user interrupt, the processor may deliver that interrupt on the following instruction boundary.

Although user-interrupt notification processing may occur at any privilege level, all of the memory accesses in the first two actions are performed with supervisor privilege in some examples.

The first two actions each access the UPID using a linear address and may therefore incur faults (page faults, or general-protection faults due to canonicality violations). If such a fault produces an error code that uses the EXT bit, that bit will be set to 1.

If such a fault occurs, updates to architectural state performed by the earlier user-interrupt notification identification remain committed and are not undone; if such a fault occurs at the second action (if it is not performed atomically with the first action), any update to architectural state performed by the first action also remains committed. System software is advised to prevent such faults (e.g., by ensuring that no page fault occurs and that the linear address in the IA32_UINTR_PD MSR is canonical with respect to the paging mode in use).

The user-interrupt notification identification that precedes user-interrupt notification processing may occur due to an ordinary interrupt, a virtual interrupt, or an interrupt injected by VM entry. The following items specify the activity state of the logical processor for each of these cases of user-interrupt notification processing:
  If user-interrupt notification identification was due to an ordinary interrupt or a virtual interrupt and the logical processor had been in the HLT state before that interrupt, it returns to the HLT state following user-interrupt notification processing.
  If user-interrupt notification identification was due to an interrupt injected by VM entry and the activity-state field in the guest-state area of the VMCS indicated the HLT state, the logical processor enters the HLT state following user-interrupt notification processing.
  In other cases, the logical processor is in the active state following user-interrupt notification processing.

Instructions

In embodiments, a user-interrupt architecture includes new instructions for control-flow transfer and access to new state. UIRET is a new instruction to effect a return from a user-interrupt handler. Other new instructions allow access by user code to UIF. User IPIs also use a new instruction, SENDUIPI. Examples of these instructions are in the figures.

User IPIs

Processors support the sending of interprocessor user interrupts (user IPIs) through a user-interrupt target table (configured by system software) and the SENDUIPI instruction (executed by application software).

The user-interrupt target table (UITT) is a data structure composed of 16-byte entries. Each UITT entry (UITTE) has the following format:
  Bit 0: V, a valid bit.
  Bits 7:1 are reserved and fixed at 0.
  Bits 15:8: UV, the user-interrupt vector (in the range 0-63, so bits 15:14 are fixed at 0).
  Bits 63:16 are reserved.
  Bits 127:64: UPIDADDR, the linear address of a UPID (64-byte aligned, so bits 69:64 are fixed at 0).

In some embodiments, the UITT is located at the linear address UITTADDR; UITTSZ is the highest index of a valid entry in the UITT (thus, the number of entries in the UITT is UITTSZ+1).

Existing Instruction Support

Certain instructions support the user-interrupt architecture in some examples. The RDMSR and WRMSR instructions support access to the user-interrupt MSRs. The architecture is also supported by the XSAVE feature set.

Support by RDMSR and WRMSR

The RDMSR and WRMSR instructions support normal read and write operations for the user-interrupt MSRs. These operations are supported even if CR4.UINTR=0. The following items identify points that are specific to these MSRs:
  IA32_UINTR_RR MSR (MSR address 985H). This MSR holds the current value of UIRR. Following a WRMSR to this MSR, the logical processor recognizes a pending user interrupt if and only if some bit is set in the MSR.
  IA32_UINTR_HANDLER MSR (MSR address 986H). This MSR holds the current value of UIHANDLER. This is a linear address that must be canonical relative to the maximum linear-address width supported by the processor. WRMSR to this MSR causes a general-protection fault (#GP) if its source operand does not meet this requirement.
  IA32_UINTR_STACKADJUST MSR (MSR address 987H). This MSR holds the current value of UISTACKADJUST. This value includes a linear address that is established relative to the maximum linear-address width supported by the processor. If not, WRMSR to this MSR causes a general-protection fault (#GP). Bit 0 of this MSR corresponds to UISTACKADJUST[0], which controls how user-interrupt delivery updates the stack pointer. WRMSR may set it to either 0 or 1.
  IA32_UINTR_MISC MSR (MSR address 988H). Bits 31:0 of this MSR hold the current value of UITTSZ, while bits 39:32 hold the current value of UINV. Bits 63:40 of this MSR are reserved. WRMSR causes a #GP if it would set any of those bits (if EDX[31:8] not equal to 000000H). Because this MSR shares an 8-byte portion of the XSAVE area with UIF, bit 63 of the MSR will not be used and will be reserved.

IA32_UINTR_PD MSR (MSR address 989H). This MSR holds the current value of UPIDADDR. This is a linear address that is canonical relative to the maximum linear-address width supported by the processor. If not, WRMSR to this MSR causes a general-protection fault (#GP). Bits 5:0 of this MSR are reserved. WRMSR causes a #GP if it would set any of those bits (if EAX[5:0] does not equal 000000b).

IA32_UINTR TT MSR (MSR address 98AH). Bit 63:4 of this MSR holds the current value of UITTADDR. This a linear address that is canonical relative to the maximum linear-address width supported by the processor. If not, WRMSR to this MSR causes a general-protection fault (#GP). Bits 3:1 of this MSR are reserved. WRMSR causes a #GP if it would set any of those bits (if EAX[3:1] does not equal 000b). Bit 0 of this MSR determines whether the SENDUIPI instruction is enabled. WRMSR may set it to either 0 or 1.

Support by the XSAVE Feature Set

The state identified above may be specific to an OS-managed user thread, and system software would then need to change the values of this state when changing user threads. This context management is facilitated by adding support for this state to the XSAVE feature set. This section describes that support.

The XSAVE feature set supports the saving and restoring of state components, each of which is a discrete set of processor registers (or parts of registers). Each such state component corresponds to an XSAVE-supported feature. The XSAVE feature set organizes the state components of the XSAVE-supported features using state component bitmaps. A state-component bitmap comprises 64 bits; each bit in such a bitmap corresponds to a single state component. Some state components are supervisor state components. The XSAVE feature supports supervisor state components with only the XSAVES and XRSTORS instructions.

User-Interrupt State Component

The XSAVE feature set will manage the user-interrupt registers with a supervisor user-interrupt state component. Bit 14 in the state-component bitmaps is assigned for the user-interrupt state component; this specification will refer to that position with the notation "UINTR." System software enables the processor to manage the user-interrupt state component by setting IA32_XSS.UINTR. (This implies that XSETBV will not allow XCR0.UINTR to be set.)

The user-interrupt state component comprises 48 bytes in memory with the following layout:
  Bytes 7:0 are for UIHANDLER (the IA32_UINTR_HANDLER MSR).
  Bytes 15:8 are for UISTACKADJUST (the IA32_UINTR_STACKADJUST MSR).
  Bytes 23:16 are for UITTSZ and UINV (from the IA32_UINTR_MISC MSR) and for UIF, organized as follows:
    Byte 19:16 is for UITTSZ (bits 31:0 of the IA32_UINTR_MISC MSR).
    Byte 20 is for UINV (bits 39:32 of the IA32_UINTR_MISC MSR).
    Bytes 22:21 (2 bytes) and bits 6:0 of byte 23 are reserved. (They may be used for bits 62:40 if the IA32_UINTR_MISC MSR, if they are defined in the future.)
    Bit 7 of byte 23 is for UIF. Because bit 7 of byte 23 is for UIF (which is not part of the IA32_UINTR_MISC MSR), software that reads a value from bytes 23:16 should clear bit 63 of that 64-bit value before attempting to write it to the IA32_UINTR_MISC MSR.
  Bytes 31:24 are for UPIDADDR (the IA32_UINTR_PD MSR).
  Bytes 39:32 are for UIRR (the IA32_UINTR_RR MSR).
  Bytes 47:40 are for UITTADDR (the IA32_UINTR TT MSR, including the bit 0, the valid bit). The user-interrupt state component is in its initial state if all user-interrupt registers are zero.

Certain portions of a supervisor state component may be identified as master-enable state. XSAVES and XRSTORS treat this state specially. UINV is the master-enable state for the user-interrupt state component.

XSAVE-Related Enumeration

The XSAVE feature set includes an architecture to enumerate details about each XSAVE-supported state component. The following items provide details of the XSAVE-specific enumeration of the user-interrupt state component:
  CPUID.(EAX=0DH,ECX=1):EBX enumerates the size in bytes of an XSAVE area containing all states currently enabled by XCR0|IA32_XSS. When IA32_XSS.UINTR[bit 14]=1, this value will include the 48 bytes required for the user-interrupt state component.
  CPUID.(EAX=0DH,ECX=1):ECX.UINTR[bit 14] is enumerated as 1, indicating that the user-interrupt state component is a supervisor state component and that IA32_XSS.UINTR can be set to 1.
  CPUID.(EAX=0DH,ECX=14):EAX is enumerated as 48 (30H), the size in bytes of the user-interrupt state component.
  CPUID.(EAX=0DH,ECX=14):EBX is enumerated as 0 (this is the case for any supervisor state component).
  CPUID.(EAX=0DH,ECX=14):ECX[0] is enumerated as 1, indicating that the user-interrupt state component is a supervisor state component.
  CPUID.(EAX=0DH,ECX=14):ECX[1] is enumerated as 0, indicating that the user-interrupt state component need not be aligned on a 64-byte boundary.
  CPUID.(EAX=0DH,ECX=14):ECX[31:2] are reserved and enumerated as 0.
  CPUID.(EAX=0DH,ECX=14):EDX is reserved and enumerated as 0.

XSAVES

The management of the user-interrupt state component by XSAVES follows the architecture of the XSAVE feature set. The following items identify points that are specific to saving the user-interrupt state component:
  XSAVES writes the user-interrupt registers to the user-interrupt state component.
  XSAVES stores zeros to bits and bytes identified as reserved.
  The values saved for UIHANDLER, UPIDADDR, and UITTADRR are canonical relative to a maximum linear-address width enumerated by CPUID. I
  After saving the user-interrupt state component, XSAVES clears UINV.

XRSTORS

The management of the user-interrupt state component by XRSTORS follows the architecture of the XSAVE feature set. The following items identify points that are specific to restoring the user-interrupt state component:
  Before restoring the user-interrupt state component, XRSTORS verifies that UINV is 0. If it is not, XRSTORS causes a general-protection fault (#GP)

before loading any part of the user-interrupt state component. (UINV is IA32_UINTR_MISC[39:32]; XRSTORS does not check the contents of the remainder of that MSR.)

If the instruction mask and XSAVE area used by XRSTORS indicates that the user-interrupt state component should be loaded from the XSAVE area, XRSTORS reads the user-interrupt registers from the XSAVE area using the format identified. The values read cause a general-protection fault (#GP) in any of the following cases:

If any of the bits and bytes identified as reserved is not zero;

If the value to be loaded into any one of UIHANDLER, UISTACKADJUST, UPIDADDR, or UITTADDR is not canonical relative to the maximum linear-address width enumerated by CPUID; or If the value to be loaded into either UPIDADDR or UITTADDR sets any of the bits reserved in that register (the reserved bits are bits 5:0 of UPIDADDR and bits 3:1 of UITTADDR; bit 0 of UITTADDR is the valid bit for SENDUIPI).

If XRSTORS causes a fault or a VM exit after loading any part of the user-interrupt state component, XRSTORS clears UINV before delivering the fault or VM exit. (Other elements of user-interrupt state, including other parts of the IA32_UINTR_MISC MSR, may retain the values that were loaded by XRSTORS.)

After a non-faulting execution of XRSTORS that loads the user-interrupt state component, the logical processor recognizes a pending user interrupt if and only if some bit is set in the new value of UIRR.

Virtual Machine Extension (VMX) Support

The VMX architecture supports virtualization of the instruction set and its system architecture. Certain extensions are used to support virtualization of user interrupts. This section describes these extensions.

VMCS Changes

A VM-exit control is defined called clear UINV. The control has been assigned position 27. A VM-entry control is defined called load UINV. The control has been assigned position 19.

Guest UINV is a new 16-bit field in the guest-state area (encoding to be determined), corresponding to UINV. The VMCS-field encoding for the guest UINV is 00000814H.

The guest UINV field exists only on processors that support the 1-setting of either the "clear UINV" VM-exit control or the "load UINV" VM-entry control.

Treatment of Ordinary Interrupts

Outside of VMX non-root operation, a logical processor with CR4.UINTR=IA32_EFER.LMA=1 responds to an ordinary interrupt by performing user-interrupt notification identification and, if it succeeds, user-interrupt notification processing.

In VMX non-root operation, the treatment of ordinary interrupts depends on the setting of the "external-interrupt exiting" VM-execution control:

If the control is 0, user-interrupt notification identification and, if it succeeds, user-interrupt notification processing occurs normally.

If the control is 1, the logical processor does not perform user-interrupt notification identification (or user-interrupt notification processing). Instead, prior existing behavior applies: a VM exit occurs (unless the interrupt causes posted-interrupt processing for interrupt virtualization).

Treatment of Virtual Interrupts

If the "virtual-interrupt delivery" VM-execution control is 1, a logical processor in VMX non-root operation may deliver virtual interrupts to guest software. This is done by using a virtual interrupt's vector to select a descriptor from the IDT and using that descriptor to deliver the interrupt.

If CR4.UINTR=IA32_EFER.LMA=1, the delivery of virtual interrupts is modified. Specifically, the logical processor first performs a form of user-interrupt notification identification:

Instead of acknowledging the local APIC, the logical processor performs the initial steps of virtual-interrupt delivery:
V:=RVI;
VISR[V]:=1;
SVI:=V;
VPPR:=V & FOH;
VIRR[V]:=0;
IF any bit is set in VIRR
THEN RVI:=highest index of bit set in VIRR ELSE RVI:=0
FI;
cease recognition of any pending virtual interrupt;
(RVI, SVI, VIRR, VISR, and VPPR are defined by the architecture for virtual interrupts.)

If V=UINV, the logical processor continues to the next step. Otherwise, a virtual interrupt with vector V is delivered normally through the IDT; the remainder of this method does not apply and user-interrupt notification processing does not occur.

Instead of writing zero to the EOI register in the local APIC, the logical processor performs the initial steps of EOI virtualization:
VISR[V]:=0;
IF any bit is set in VISR
THEN SVI:=highest index of bit set in VISR ELSE SVI:=0;
FI;
perform PPR virtualization;

Unlike EOI virtualization resulting from a guest write to the EOI register (as defined for virtual-interrupt delivery), the logical processor does not check the EOI-exit bitmap as part of this modified form of user-interrupt notification identification, and the corresponding VM exits cannot occur. This modified form of user-interrupt notification identification occurs only when virtual interrupts are not masked (e.g., if RFLAGS.IF=1).

If this modified form of user-interrupt notification identification completes the last action, the logical processor then performs user-interrupt notification processing as specified above.

A logical processor is not interruptible during this modified form of user-interrupt notification identification or between it and any subsequent user-interrupt notification processing.

A virtual interrupt that occurs during transactional execution causes the transactional execution to abort and transition to a non-transactional execution. This occurs before this modified form of user-interrupt notification identification.

A virtual interrupt that occurs while software is executing inside a protected container (e.g., an enclave) normally causes an asynchronous enclave exit (AEX). Such an AEX would occur before this modified form of user-interrupt notification identification.

VM Exits Incident to New Operations

The user-interrupt architecture introduces user-interrupt delivery and user-interrupt notification processing.

These operations access memory using linear addresses: user-interrupt delivery writes to the stack; user-interrupt notification processing read and writes a UPID at the linear address in the IA32_UINTR_PD MSR. Such memory accesses may incur faults (#GP, #PF, etc.) that may cause VM exits (depending on the configuration of the exception bitmap in the VMCS). In addition, memory accesses in VMX non-root operation may incur APIC-access VM exits, EPT violations, EPT misconfigurations, page-modification log-full VM exits, and SPP-induced VM exits.

In general, such VM exits are treated normally. The following items present special cases:

An APIC-access VM exit, an EPT violation, a page-modification log-full VM exit, or SPP-induced VM exit that occurs during user-interrupt delivery will set bit 16 of the exit qualification to 1, indicating that the VM exit was "asynchronous to instruction execution."

Any VM exit that occurs during user-interrupt notification processing (including those due to faults) will set the IDT-vectoring information field to indicate that the VM exit was incident to an interrupt with the vector UINV (to the value 8000000xyH, where xy=UINV). If the logical processor would have entered the HLT state following user-interrupt notification processing, the VM exit saves "HLT" into the activity-state field of the guest-state area of the VMCS.

Access to the User-Interrupt MSRs

The MSR bitmaps do not affect a logical processor's ability to read or write the user-interrupt MSRs as part of user-interrupt recognition, user-interrupt delivery, user-interrupt notification identification, or user-interrupt notification processing. The MSR bitmaps control only operation of the RDMSR and WRMSR instructions.

Operation of SENDUIPI

The operation of SENDUIPI concludes with the following action (executed under certain conditions):

IF local APIC is in x2APIC mode
  THEN send ordinary IPI with vector tempUPID.NV to 32-bit physical APIC ID tempUPID.NDST;
  ELSE send ordinary IPI with vector tempUPID.NV to 8-bit physical APIC ID tempUPID.NDST[15:8];
FI;

Outside of VMX non-root operation, the logical processor will send this IPI by writing to the local APIC's interrupt-command register (ICR). In VMX non-root operation, behavior depends on the settings of the "use TPR shadow" and "virtualize APIC accesses" VM-execution controls:

If the "use TPR shadow" VM-execution control is 0, the behavior is not modified: the logical processor sends the specified IPI by writing to the local APIC's ICR as specified above.

If the "use TPR shadow" VM-execution control is 1 and the "virtualize APIC accesses" VM-execution control is 0, the logical processor virtualizes the sending of an x2APIC-mode IPI by performing the following:

Writing the 64-bit value Z to offset 300H on the virtual-APIC page (VICR), where Z[7:0]=tempUPID.NV (the 8-bit virtual vector), Z[63:32]=tempUPID.NDST (the 32-bit virtual APIC ID) and Z[31:8]=000000H (indicating a physically addressed fixed-mode IPI).

Causing an APIC-write VM exit with exit qualification 300H.

APIC-write VM exits are trap-like: the value of CS:RIP saved in the guest-state area of the VMCS references the instruction after SENDUIPI. The basic exit reason for an APIC-write VM exit is "APIC write" (56). The exit qualification is the page offset of the write access that led to the VM exit—300H in this case.

If the "use TPR shadow" and "virtualize APIC accesses" VM-execution controls are both 1, the logical processor virtualizes the sending of an xAPIC-mode IPI by performing the following steps:

Writing the 32-bit value X to offset 310H on the virtual-APIC page (VICR_HI), where X[31:24]=tempUPID.NDST[15:8] (the 8-bit virtual APIC ID) and X[23:0]=000000H.

Writing the 32-bit value Y to offset 300H on the virtual-APIC page (VICR_LO), where Y[7:0]=tempUPID.NV (the 8-bit virtual vector) and Y[31:8]=000000H (indicating a physically addressed fixed-mode IPI).

Causing an APIC-write VM exit with exit qualification 300H (see above).

Changes to VM Entries

Checks on the Guest-State Area

If the "load UINV" VM-entry control is 1, VM entries ensure that bits 15:8 of the guest UINV field are 0. VM entry fails if this check fails. Such failures are treated as all VM-entry failures that occur during or after loading guest state.

Loading MSRs

VM entries may load MSRs from the VM-entry MSR-load area. If a VM entry loads any of the user-interrupt MSRs, it does so in a manner consistent with that of WRMSR.

Event Injection

The existing behavior of VM entry is such that, if the VM-entry interruption-information field has a value of the form 8000000xyH, VM entry injects an interrupt with vector V=xyH. This is done by using V to select a descriptor from the IDT and using that descriptor to deliver the interrupt.

If bit 25 (UINTR) is set to 1 in the CR4 field in the guest-state area of the VMCS and the "IA-32e mode guest" VM-entry control is 1, VM entry is modified if it is injecting an interrupt. Specifically, the logical processor first performs a form of user-interrupt notification identification:

This action, acknowledging the local APIC, is omitted.

If UINV=V (where V is the vector of the interrupt being injected), the logical processor continues to the next action. Otherwise, an interrupt with vector V is delivered normally through the IDT; the remainder of this method does not apply and user-interrupt notification processing does not occur.

This action, writing zero to the EOI register in the local APIC, is omitted.

Because VM entry allows interrupt injection only when interrupts are not masked in a guest (e.g., when RFLAGS is being loaded with a value that sets bit 9, IF), this modified form of user-interrupt notification identification occurs only when virtual interrupts are not masked.

If user-interrupt notification identification completes the second action, the logical processor then performs user-interrupt notification processing.

A logical processor is not interruptible during this modified form of user-interrupt notification identification or between it and any subsequent user-interrupt notification processing.

This change in VM-entry event injection occurs as long as UINTR is set to 1 in the CR4 field in the guest-state area of the VMCS and the "IA-32e mode guest" VM-entry control is 1; the settings of the "external-interrupt exiting" and "virtual-interrupt delivery" VM-execution controls do not affect this change.

User-Interrupt Recognition after VM Entry

A VM entry results in recognition of a pending user interrupt if it completes with UIRR not equal to 0; if it completes with UIRR=0, no pending user interrupt is recognized.

Changes to VM Exits

Recording VM-Exit Information

An APIC-access VM exit, an EPT violation, or a page-modification log-full VM exit that occurs during user-interrupt delivery sets bit 16 of the exit qualification to 1, indicating that the VM exit was "asynchronous to instruction execution."

A VM exit that occurs during user-interrupt notification processing sets the IDT-vectoring information field to indicate that the VM exit was incident to an interrupt with the vector UINV (to the value 8000000xyH, where xy=UINV).

Saving Guest State

If a processor supports user interrupts, every VM exit saves UINV into the guest UINV field in the VMCS (bits 15:8 of the field are cleared).

Saving MSRs

VM exits may save MSRs into the VM-exit MSR-store area. If a VM exit saves any of the user-interrupt MSRs, it does so in a manner consistent with that of RDMSR.

Loading Host State

If the "clear UINV" VM-exit control is 1, VM exit clears UINV.

Loading MSRs

VM exits may load MSRs from the VM-exit MSR-load area. If a VM exit loads any of the user-interrupt MSRs, it does so in a manner consistent with that of WRMSR.

User-Interrupt Recognition after VM Exit

A VM exit results in recognition of a pending user interrupt if it completes with UIRR not equal to 0; if it completes with user interrupt is recognized.

Embodiments may include a new VM-exit control "clear UINV" (e.g., at bit position 27). Some processors supporting the 1-settings of this control enumerate that support by setting bit 59 in each of the IA32_VMX_EXIT_CTLS MSR (index 483H) and the IA32_VMX_TRUE_EXIT_CTLS MSR (index 48FH).

Embodiments may include a new VM-entry control "load UINV" (e.g., at bit position 19. Some processors supporting the 1 settings of this control enumerate that support by setting bit 51 in each of the IA32_VMX_ENTRY_CTLS MSR (index 484H) and the IA32_VMX_TRUE_ENTRY_CTLS MSR (index 490H).

Embodiments may include a new control bit (e.g., CR4 [25] as CR4.UINTR in CR4). Processors supporting the 1-settings of that bit in VMX operation may enumerate that support (e.g., by setting bit 25 in the IA32_VMX_CR4_FIXED1 MSR (index 489H)).

Example Embodiments

In an embodiment, a processing system includes a memory and a processing core. The memory is to store an interrupt control data structure associated with a first application being executed by the processing system. The processing core includes an instruction decoder to decode a first instruction, invoked by a second application, to send an interprocessor interrupt to the first application; and, in response to the decoded instruction, is to determine that an identifier of the interprocessor interrupt matches a notification interrupt vector associated with the first application; set, in the interrupt control data structure, a pending interrupt flag corresponding to an identifier of the interprocessor interrupt; and invoke an interrupt handler for the interprocessor interrupt identified by the interrupt control data structure.

Any such embodiments may include any or any combination of the following aspects. The processor core is also to, responsive to setting the pending interrupt flag, trigger a micro-architectural event indicating pendency of the interprocessor interrupt. The processing core is also to invoke the interrupt handler responsive to detecting the micro-architectural event. The interrupt control data structure includes a bitmap comprising plurality of pending interrupt bits, wherein a position of each bit within the bitmap corresponds to an interrupt identifier. The processing system also includes a processing logic to, responsive to identifying the interprocessor interrupt as a user-level interrupt, identify an address of a posted interrupt descriptor associated with the first application; set, in the posted interrupt descriptor data structure, a flag corresponding to an identifier of the interprocessor interrupt; and transmit a notification interrupt having an interrupt number identified by the posted interrupt descriptor. Invoking the interrupt handler also includes storing a current value of an instruction pointer on a stack; and loading an address of the interrupt handler into the instruction pointer. The processing system is implemented as a System-on-Chip (SoC). Invoking the interrupt handler also includes selecting a highest priority pending interrupt among pending interrupts identified by the interrupt control data structure. The notification interrupt vector is identified by a pre-defined field of a posted interrupt descriptor data structure associated with the first application.

In embodiments, a method includes invoking, by a first application being executed by a processor, a first instruction to send an interprocessor interrupt to a second application; decoding, by an instruction decoder of the processor; determining, by the processor in response to the decoded instruction, that an identifier of the interprocessor interrupt matches a notification interrupt vector associated with a second application being executed by the processing; setting, in an interrupt control data structure associated with the second application, a pending interrupt flag corresponding to an identifier of the interprocessor interrupt; and invoking an interrupt handler for the interprocessor interrupt identified by the interrupt control data structure.

Any such embodiments may include any or any combination of the following aspects. The method also includes, responsive to setting the pending interrupt flag, triggering a micro-architectural event indicating pendency of the interprocessor interrupt. The method also includes invoking the interrupt handler responsive to detecting the micro-architectural event. Invoking the user-level interrupt handler also includes storing a current value of an instruction pointer on a stack; and loading an address of the interrupt handler into the instruction pointer. The interrupt control data structure includes a bitmap comprising plurality of pending interrupt bits, wherein a position of each bit within the bitmap corresponds to an interrupt identifier. The method also includes, responsive to identifying the interprocessor interrupt as a user-level interrupt, identifying an address of a posted interrupt descriptor associated with the second application; setting, in the posted interrupt descriptor data structure, a flag corresponding to an identifier of the incoming interrupt; and transmitting a notification interrupt having an interrupt number identified by the posted interrupt descriptor. Invoking the interrupt handler also includes selecting a highest priority pending interrupt among pending interrupts identified by the interrupt control data structure. The notification interrupt vector is identified by a pre-defined field of a posted interrupt descriptor data structure associated with the second application.

In embodiments, an apparatus may include means for performing any function disclosed herein. In embodiments, an apparatus may include a data storage device that stores code that when executed by a hardware processor causes the hardware processor to perform any method disclosed herein. In embodiments, an apparatus may be as described in the detailed description. In embodiments, a method may be as described in the detailed description. In embodiments, a non-transitory machine-readable medium may store instructions that when executed by a machine causes the machine to perform a method including any method disclosed herein. Embodiments may include any details, features, etc. or combinations of details, features, etc. described in this specification.

Example Computer Architectures

Detailed below are describes of example computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 11:
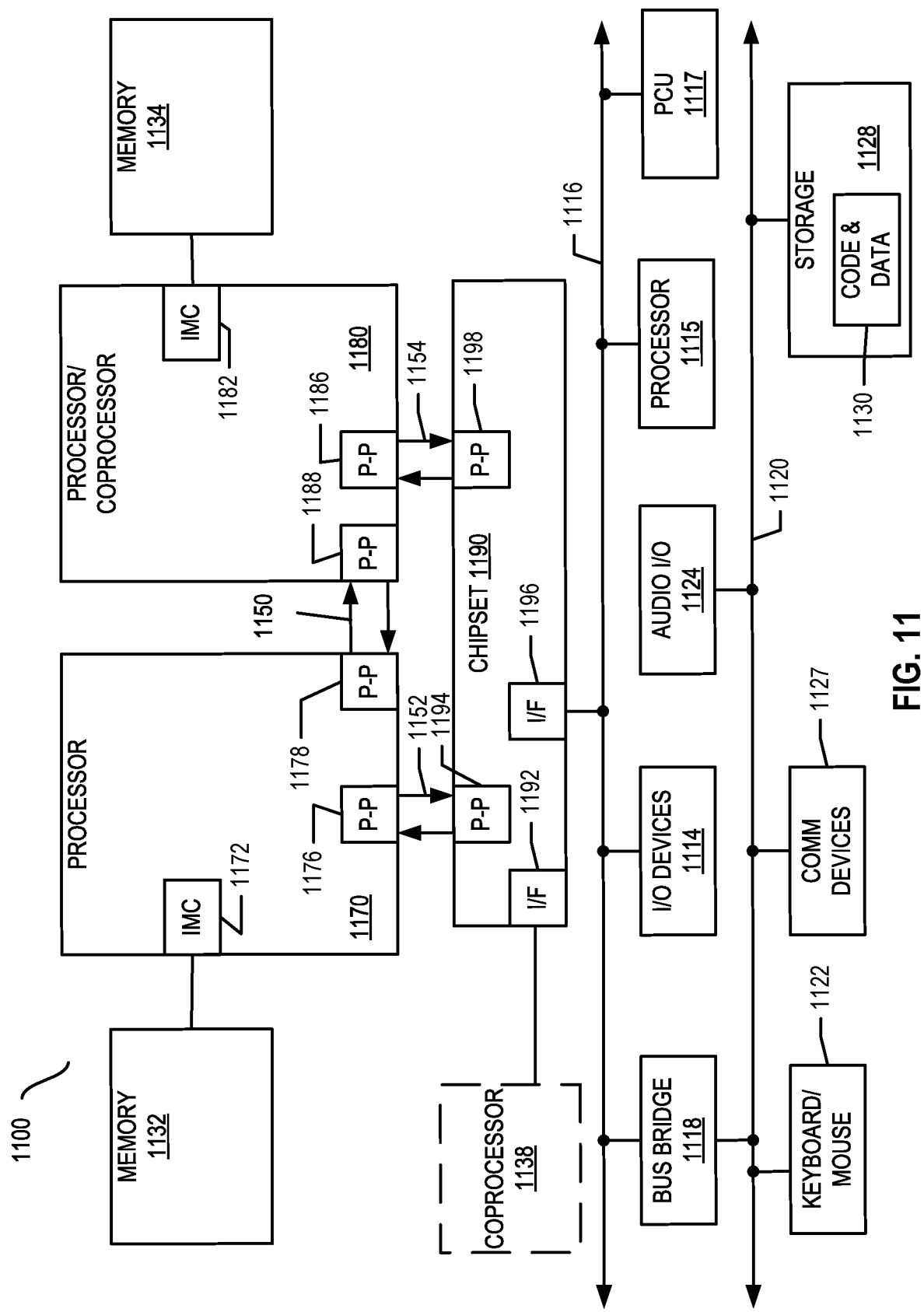
FIG. 11 illustrates embodiments of an example system.

FIG. 11 illustrates embodiments of an example system. Multiprocessor system 1100 is a point-to-point interconnect system and includes a plurality of processors including a first processor 1170 and a second processor 1180 coupled via a point-to-point interconnect 1150. In some embodiments, the first processor 1170 and the second processor 1180 are homogeneous. In some embodiments, first processor 1170 and the second processor 1180 are heterogenous.

Processors 1170 and 1180 are shown including integrated memory controller (IMC) units circuitry 1172 and 1182, respectively. Processor 1170 also includes as part of its interconnect controller units point-to-point (P-P) interfaces 1176 and 1178; similarly, second processor 1180 includes P-P interfaces 1186 and 1188. Processors 1170, 1180 may exchange information via the point-to-point (P-P) interconnect 1150 using P-P interface circuits 1178, 1188. IMCs 1172 and 1182 couple the processors 1170, 1180 to respective memories, namely a memory 1132 and a memory 1134, which may be portions of main memory locally attached to the respective processors.

Processors 1170, 1180 may each exchange information with a chipset 1190 via individual P-P interconnects 1152, 1154 using point to point interface circuits 1176, 1194, 1186, 1198. Chipset 1190 may optionally exchange information with a coprocessor 1138 via a high-performance interface 1192. In some embodiments, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor 1170, 1180 or outside of both processors, yet connected with the processors via P-P interconnect, such that either or both processors' local cache information may be stored in the shared cache if a processor is placed into a low power mode.

Chipset 1190 may be coupled to a first interconnect 1116 via an interface 1196. In some embodiments, first interconnect 1116 may be a Peripheral Component Interconnect (PCI) interconnect, or an interconnect such as a PCI Express interconnect or another I/O interconnect. In some embodiments, one of the interconnects couples to a power control unit (PCU) 1117, which may include circuitry, software, and/or firmware to perform power management operations with regard to the processors 1170, 1180 and/or co-processor 1138. PCU 1117 provides control information to a voltage regulator to cause the voltage regulator to generate the appropriate regulated voltage. PCU 1117 also provides control information to control the operating voltage generated. In various embodiments, PCU 1117 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 1117 is illustrated as being present as logic separate from the processor 1170 and/or processor 1180. In other cases, PCU 1117 may execute on a given one or more of cores (not shown) of processor 1170 or 1180. In some cases, PCU 1117 may be implemented as a microcontroller (dedicated or general-purpose) or other control logic configured to execute its own dedicated power management code, sometimes referred to as P-code. In yet other embodiments, power management operations to be performed by PCU 1117 may be implemented externally to a processor, such as by way of a separate power management integrated circuit (PMIC) or another component external to the processor. In yet other embodiments, power management operations to be performed by PCU 1117 may be implemented within BIOS or other system software.

Various I/O devices 1114 may be coupled to first interconnect 1116, along with an interconnect (bus) bridge 1118 which couples first interconnect 1116 to a second interconnect 1120. In some embodiments, one or more additional processor(s) 1115, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 1116. In some embodiments, second interconnect 1120 may be a low pin count (LPC) interconnect. Various devices may be coupled to second interconnect 1120 including, for example, a keyboard and/or mouse 1122, communication devices 1127 and a storage unit circuitry 1128. Storage unit circuitry 1128 may be a disk drive or other mass storage device which may include instructions/code and data 1130, in some embodiments. Further, an audio I/O 1124 may be coupled to second interconnect 1120. Note that other architectures than the point-to-point architecture described above are possible. For example, instead of the point-to-point architecture, a system such as multiprocessor system 1100 may implement a multi-drop interconnect or other such architecture.

Example Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Example core architectures are described next, followed by descriptions of example processors and computer architectures.

Figure 12:
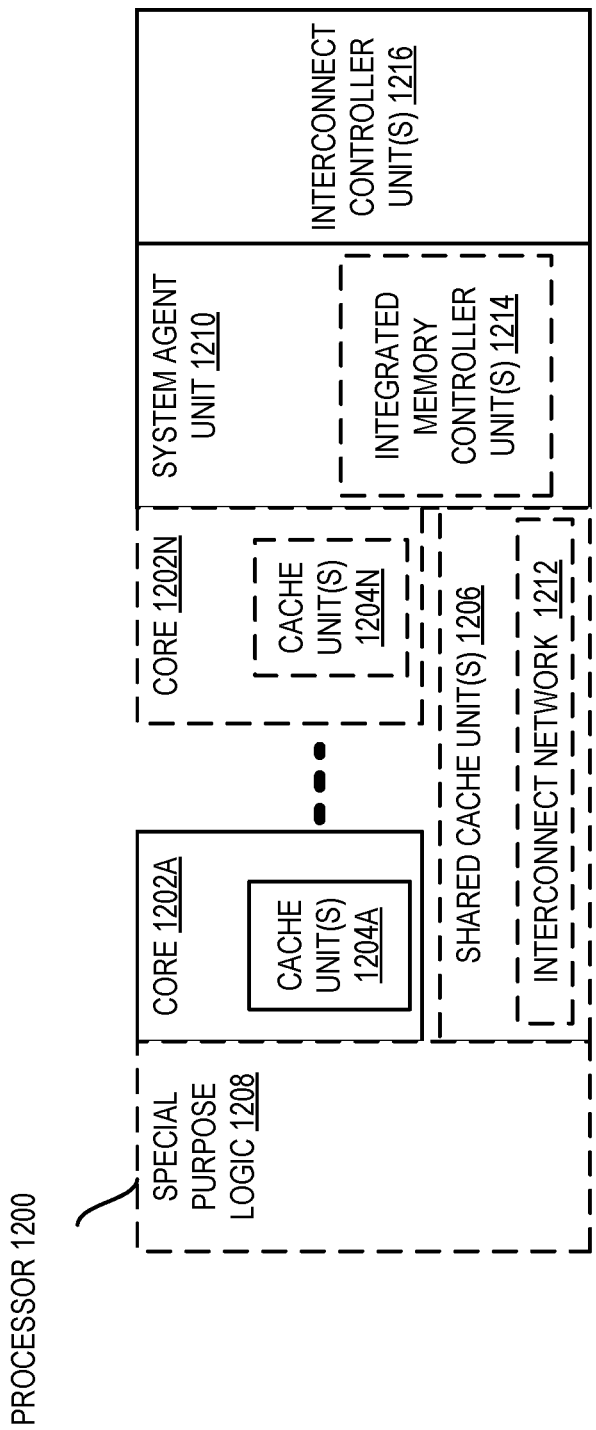
FIG. 12 illustrates a block diagram of embodiments of a processor that may have more than one core, may have an integrated memory controller, and may have integrated graphics.

FIG. 12 illustrates a block diagram of embodiments of a processor 1200 that may have more than one core, may have an integrated memory controller, and may have integrated graphics. The solid lined boxes illustrate a processor 1200 with a single core 1202A, a system agent 1210, a set of one or more interconnect controller units circuitry 1216, while the optional addition of the dashed lined boxes illustrates an alternative processor 1200 with multiple cores 1202(A)-(N), a set of one or more integrated memory controller unit(s) circuitry 1214 in the system agent unit circuitry 1210, and special purpose logic 1208, as well as a set of one or more interconnect controller units circuitry 1216. Note that the processor 1200 may be one of the processors 1170 or 1180, or co-processor 1138 or 1115 of FIG. 11.

Thus, different implementations of the processor 1200 may include: 1) a CPU with the special purpose logic 1208 being integrated graphics and/or scientific (throughput) logic (which may include one or more cores, not shown), and the cores 1202(A)-(N) being one or more general purpose cores (e.g., general purpose in-order cores, general purpose out-of-order cores, or a combination of the two); 2) a coprocessor with the cores 1202(A)-(N) being a large number of special purpose cores intended primarily for graphics and/or scientific (throughput); and 3) a coprocessor with the cores 1202(A)-(N) being a large number of general purpose in-order cores. Thus, the processor 1200 may be a general-purpose processor, coprocessor, or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

A memory hierarchy includes one or more levels of cache unit(s) circuitry 1204(A)-(N) within the cores 1202(A)-(N), a set of one or more shared cache units circuitry 1206, and external memory (not shown) coupled to the set of integrated memory controller units circuitry 1214. The set of one or more shared cache units circuitry 1206 may include one or more mid-level caches, such as level 2 (L2), level 3 (L3), level 4 (L4), or other levels of cache, such as a last level cache (LLC), and/or combinations thereof. While in some embodiments ring-based interconnect network circuitry 1212 interconnects the special purpose logic 1208 (e.g., integrated graphics logic), the set of shared cache units circuitry 1206, and the system agent unit circuitry 1210, alternative embodiments use any number of well-known techniques for interconnecting such units. In some embodiments, coherency is maintained between one or more of the shared cache units circuitry 1206 and cores 1202(A)-(N).

In some embodiments, one or more of the cores 1202(A)-(N) are capable of multi-threading. The system agent unit circuitry 1210 includes those components coordinating and operating cores 1202(A)-(N). The system agent unit circuitry 1210 may include, for example, power control unit (PCU) circuitry and/or display unit circuitry (not shown). The PCU may be or may include logic and components needed for regulating the power state of the cores 1202(A)-(N) and/or the special purpose logic 1208 (e.g., integrated graphics logic). The display unit circuitry is for driving one or more externally connected displays.

The cores 1202(A)-(N) may be homogenous or heterogeneous in terms of architecture instruction set; that is, two or more of the cores 1202(A)-(N) may be capable of executing the same instruction set, while other cores may be capable of executing only a subset of that instruction set or a different instruction set.

Example Core Architectures
In-Order and Out-of-Order Core Block Diagram

Figure 13A:
FIG. 13(A) is a block diagram illustrating both an example in-order pipeline and an example register renaming, out-of-order issue/execution pipeline according to embodiments of the invention.
Figure 13B:
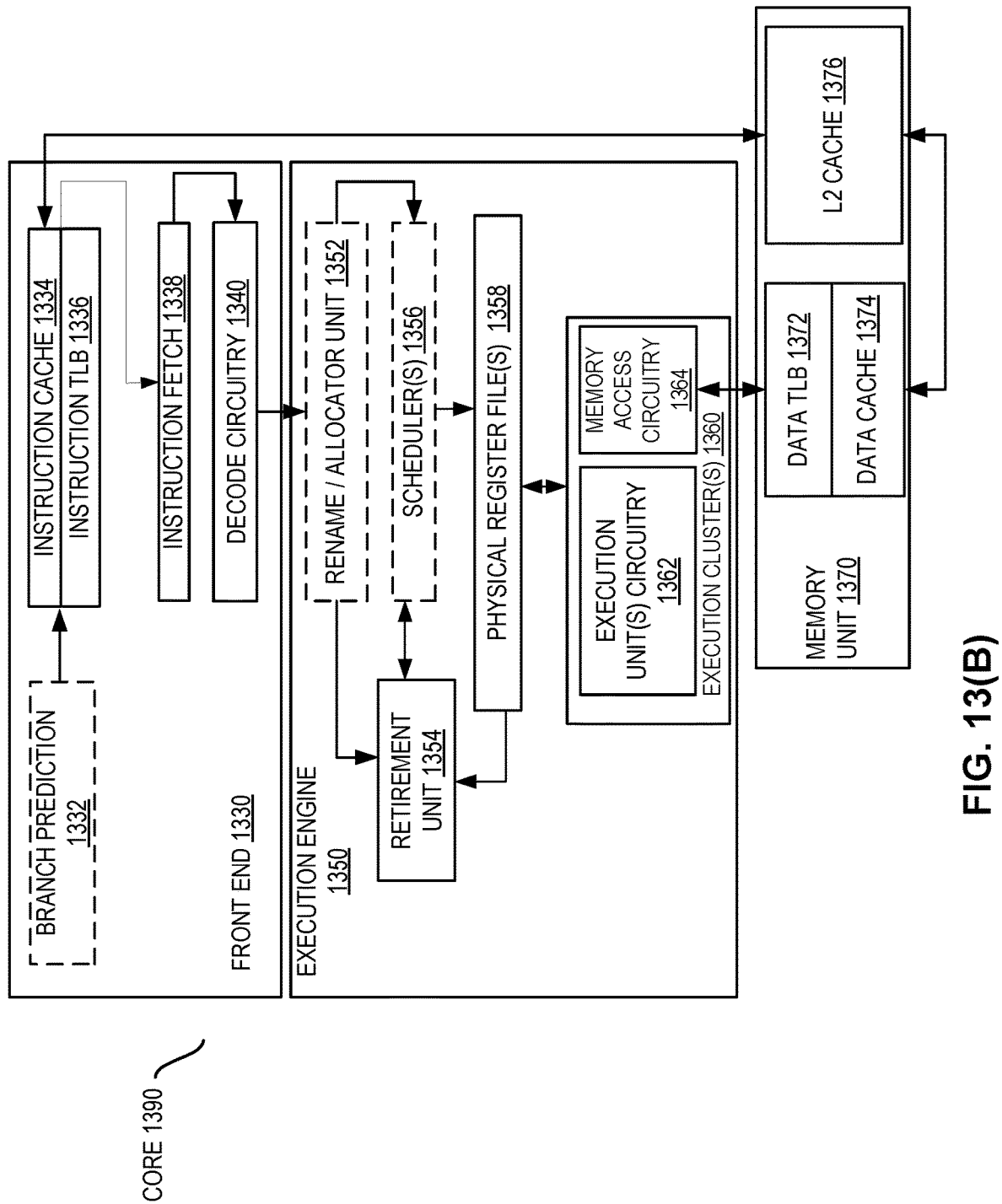
FIG. 13(B) is a block diagram illustrating both an example embodiment of an in-order architecture core and an example register renaming, out-of-order issue/execution architecture core to be included in a processor according to embodiments of the invention.

FIG. 13(A) is a block diagram illustrating both an example in-order pipeline and an example register renaming, out-of-order issue/execution pipeline according to embodiments of the invention. FIG. 13(B) is a block diagram illustrating both an example embodiment of an in-order architecture core and an example register renaming, out-of-order issue/execution architecture core to be included in a processor according to embodiments of the invention. The solid lined boxes in FIGS. 13(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13(A), a processor pipeline 1300 includes a fetch stage 1302, an optional length decode stage 1304, a decode stage 1306, an optional allocation stage 1308, an optional renaming stage 1310, a scheduling (also known as a dispatch or issue) stage 1312, an optional register read/memory read stage 1314, an execute stage 1316, a write back/memory write stage 1318, an optional exception handling stage 1322, and an optional commit stage 1324. One or more operations can be performed in each of these processor pipeline stages. For example, during the fetch stage 1302, one or more instructions are fetched from instruction memory, during the decode stage 1306, the one or more fetched instructions may be decoded, addresses (e.g., load store unit (LSU) addresses) using forwarded register ports may be generated, and branch forwarding (e.g., immediate offset or a link register (LR)) may be performed. In one embodiment, the decode stage 1306 and the register read/memory read stage 1314 may be combined into one pipeline stage. In one embodiment, during the execute stage 1316, the decoded instructions may be executed, LSU address/data pipelining to an Advanced Microcontroller Bus (AHB) interface may be performed, multiply and add operations may be performed, arithmetic operations with branch results may be performed, etc.

By way of example, the example register renaming, out-of-order issue/execution core architecture may implement the pipeline 1300 as follows: 1) the instruction fetch 1338 performs the fetch and length decoding stages 1302 and 1304; 2) the decode unit circuitry 1340 performs the decode stage 1306; 3) the rename/allocator unit circuitry 1352 performs the allocation stage 1308 and renaming stage 1310; 4) the scheduler unit(s) circuitry 1356 performs the schedule stage 1312; 5) the physical register file(s) unit(s) circuitry 1358 and the memory unit circuitry 1370 perform the register read/memory read stage 1314; the execution cluster 1360 perform the execute stage 1316; 6) the memory unit circuitry 1370 and the physical register file(s) unit(s) circuitry 1358 perform the write back/memory write stage 1318; 7) various units (unit circuitry) may be involved in the exception handling stage 1322; and 8) the retirement unit circuitry 1354 and the physical register file(s) unit(s) circuitry 1358 perform the commit stage 1324.

FIG. 13(B) shows processor core 1390 including front-end unit circuitry 1330 coupled to an execution engine unit circuitry 1350, and both are coupled to a memory unit circuitry 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front-end unit circuitry 1330 may include branch prediction unit circuitry 1332 coupled to an instruction cache unit circuitry 1334, which is coupled to an instruction translation lookaside buffer (TLB) 1336, which is coupled to instruction fetch unit circuitry 1338, which is coupled to decode unit circuitry 1340. In one embodiment, the instruction cache unit circuitry 1334 is included in the memory unit circuitry 1370 rather than the front-end unit circuitry 1330. The decode unit circuitry 1340 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 1340 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 1340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1390 includes a microcode ROM (not shown) or other medium that stores microcode for certain macroinstructions (e.g., in decode unit circuitry 1340 or otherwise within the front-end unit circuitry 1330). In one embodiment, the decode unit circuitry 1340 includes a micro-operation (micro-op) or operation cache (not shown) to hold/cache decoded operations, micro-tags, or micro-operations generated during the decode or other stages of the processor pipeline 1300. The decode unit circuitry 1340 may be coupled to rename/allocator unit circuitry 1352 in the execution engine unit circuitry 1350.

The execution engine circuitry 1350 includes the rename/allocator unit circuitry 1352 coupled to a retirement unit circuitry 1354 and a set of one or more scheduler(s) circuitry 1356. The scheduler(s) circuitry 1356 represents any number of different schedulers, including reservations stations, central instruction window, etc. In some embodiments, the scheduler(s) circuitry 1356 can include arithmetic logic unit (ALU) scheduler/scheduling circuitry, ALU queues, arithmetic generation unit (AGU) scheduler/scheduling circuitry, AGU queues, etc. The scheduler(s) circuitry 1356 is coupled to the physical register file(s) circuitry 1358. Each of the physical register file(s) circuitry 1358 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit circuitry 1358 includes vector registers unit circuitry, writemask registers unit circuitry, and scalar register unit circuitry. These register units may provide architectural vector registers, vector mask registers, general-purpose registers, etc. The physical register file(s) unit(s) circuitry 1358 is overlapped by the retirement unit circuitry 1354 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1354 and the physical register file(s) circuitry 1358 are coupled to the execution cluster(s) 1360. The execution cluster(s) 1360 includes a set of one or more execution units circuitry 1362 and a set of one or more memory access circuitry 1364. The execution units circuitry 1362 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 1356, physical register file(s) unit(s) circuitry 1358, and execution cluster(s) 1360 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 1364). It should also be understood that where separate pipelines are used, one or more of these pipelines may be out-of-order issue/execution and the rest in-order.

In some embodiments, the execution engine unit circuitry 1350 may perform load store unit (LSU) address/data pipelining to an Advanced Microcontroller Bus (AHB) interface (not shown), and address phase and writeback, data phase load, store, and branches.

The set of memory access circuitry 1364 is coupled to the memory unit circuitry 1370, which includes data TLB unit circuitry 1372 coupled to a data cache circuitry 1374 coupled to a level 2 (L2) cache circuitry 1376. In one example embodiment, the memory access units circuitry 1364 may include a load unit circuitry, a store address unit circuit, and a store data unit circuitry, each of which is coupled to the data TLB circuitry 1372 in the memory unit circuitry 1370. The instruction cache circuitry 1334 is further coupled to a level 2 (L2) cache unit circuitry 1376 in the memory unit circuitry 1370. In one embodiment, the instruction cache 1334 and the data cache 1374 are combined into a single instruction and data cache (not shown) in L2 cache unit circuitry 1376, a level 3 (L3) cache unit circuitry (not shown), and/or main memory. The L2 cache unit circuitry 1376 is coupled to one or more other levels of cache and eventually to a main memory.

The core 1390 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the core 1390 includes logic to support a packed data instruction set extension (e.g., AVX1, AVX2), thereby allowing the operations used by many multimedia applications to be performed using packed data.

Example Execution Unit(s) Circuitry

Figure 14:
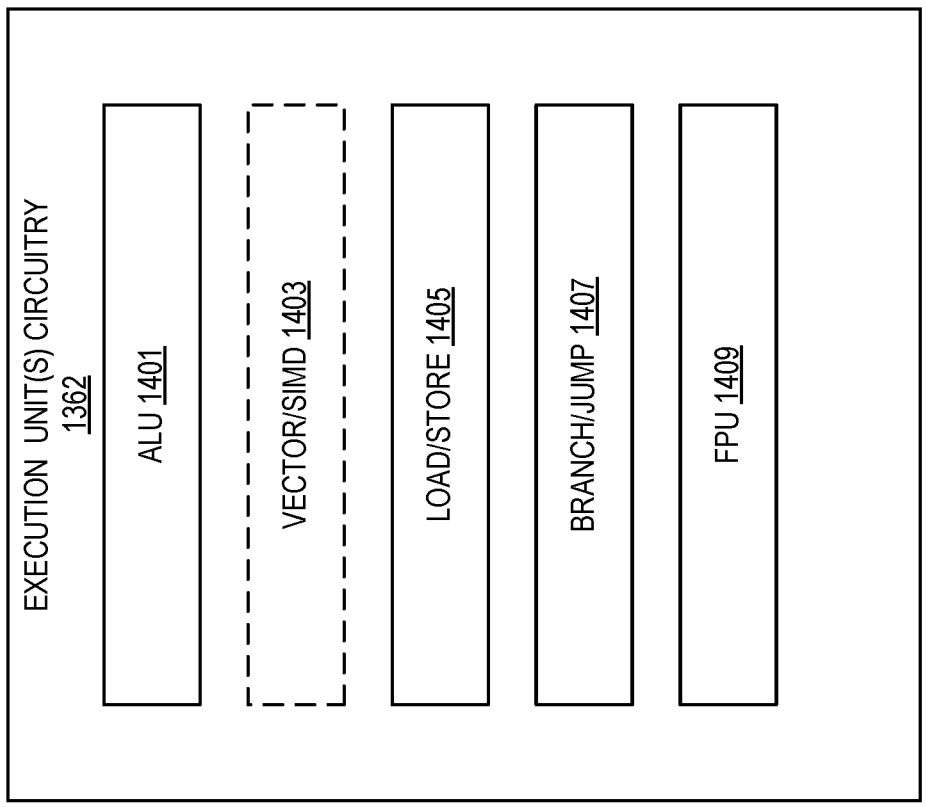
FIG. 14 illustrates embodiments of execution unit(s) circuitry, such as execution unit(s) circuitry of FIG. 13(B).

FIG. 14 illustrates embodiments of execution unit(s) circuitry, such as execution unit(s) circuitry 1362 of FIG. 13(B). As illustrated, execution unit(s) circuitry 1362 may include one or more ALU circuits 1401, vector/SIMD unit circuits 1403, load/store unit circuits 1405, and/or branch/jump unit circuits 1407. ALU circuits 1401 perform integer arithmetic and/or Boolean operations. Vector/SIMD unit circuits 1403 perform vector/SIMD operations on packed data (such as SIMD/vector registers). Load/store unit circuits 1405 execute load and store instructions to load data from memory into registers or store from registers to memory. Load/store unit circuits 1405 may also generate addresses. Branch/jump unit circuits 1407 cause a branch or jump to a memory address depending on the instruction. Floating-point unit (FPU) circuits 1409 perform floating-point arithmetic. The width of the execution unit(s) circuitry 1362 varies depending upon the embodiment and can range from 16-bit to 1,024-bit. In some embodiments, two or more smaller execution units are logically combined to form a larger execution unit (e.g., two 128-bit execution units are logically combined to form a 256-bit execution unit).

Example Register Architecture

Figure 15:
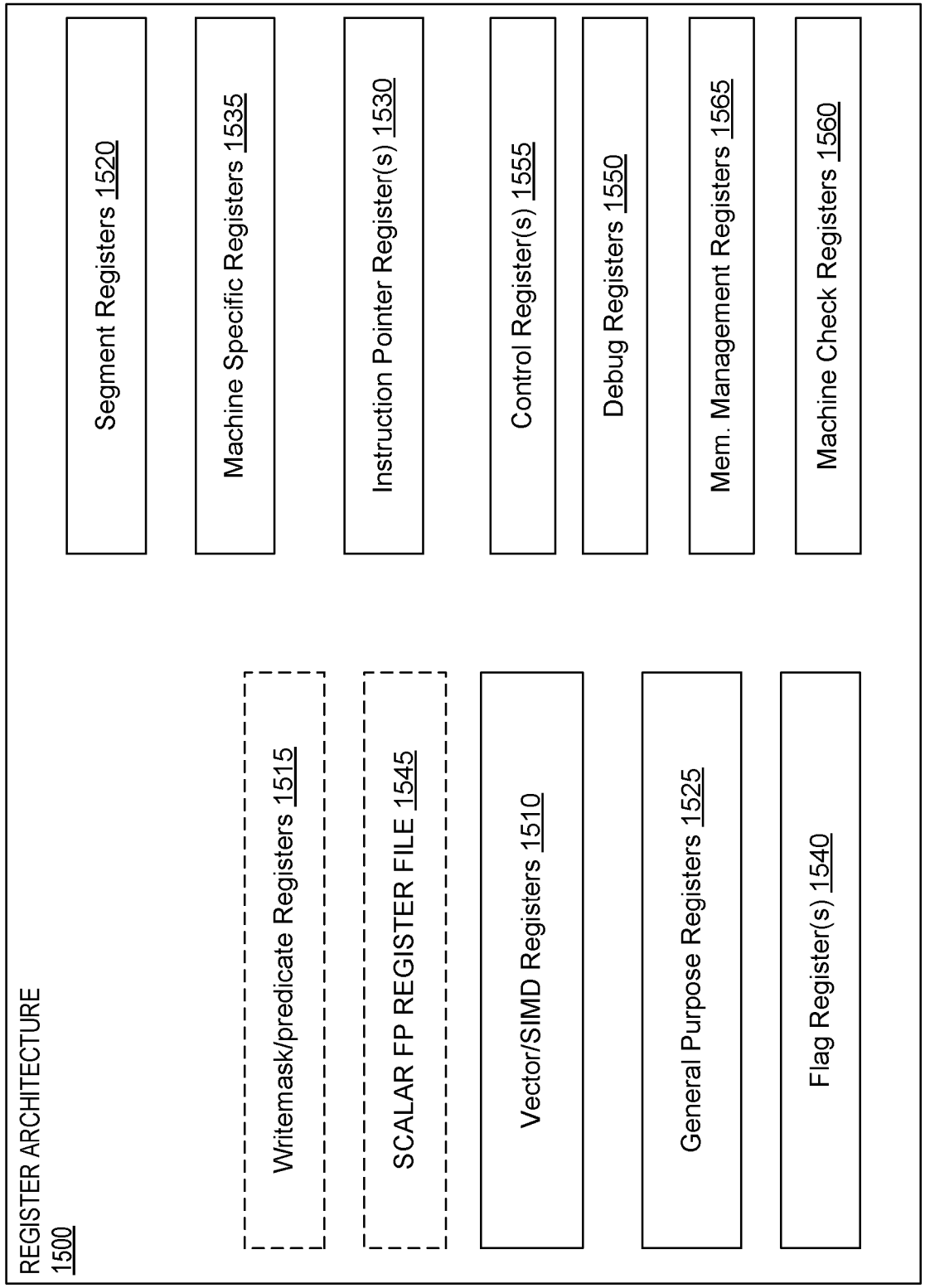
FIG. 15 is a block diagram of a register architecture according to some embodiments.

FIG. 15 is a block diagram of a register architecture 1500 according to some embodiments. As illustrated, there are vector/SIMD registers 1510 that vary from 128-bit to 1,024 bits width. In some embodiments, the vector/SIMD registers 1510 are physically 512-bits and, depending upon the mapping, only some of the lower bits are used. For example, in some embodiments, the vector/SIMD registers 1510 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 1500 includes writemask/predicate registers 1515. For example, in some embodiments, there are 8 writemask/predicate registers (sometimes called k0 through k7) that are each 16-bit, 32-bit, 64-bit, or 128-bit in size. Writemask/predicate registers 1515 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 1515 corresponds to a data element position of the destination. In other embodiments, the writemask/predicate registers 1515 are scalable and consists of a set number of enable bits for a given vector element (e.g., 8 enable bits per 64-bit vector element).

The register architecture 1500 includes a plurality of general-purpose registers 1525. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 1500 includes scalar floating-point register 1545 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 1540 (e.g., EFLAGS, RFLAGS, etc.) store status and control information for arithmetic, compare, and system operations. For example, the one or more flag registers 1540 may store condition code information such as carry, parity, auxiliary carry, zero, sign, and overflow. In some embodiments, the one or more flag registers 1540 are called program status and control registers.

Segment registers 1520 contain segment points for use in accessing memory. In some embodiments, these registers are referenced by the names CS, DS, SS, ES, FS, and GS.

Machine specific registers (MSRs) 1535 control and report on processor performance. Most MSRs 1535 handle system-related functions and are not accessible to an application program. Machine check registers 1560 consist of control, status, and error reporting MSRs that are used to detect and report on hardware errors.

One or more instruction pointer register(s) 1530 store an instruction pointer value. Control register(s) 1555 (e.g., CR0-CR4) determine the operating mode of a processor (e.g., processor 1170, 1180, 1138, 1115, and/or 1200) and the characteristics of a currently executing task. Debug registers 1550 control and allow for the monitoring of a processor or core's debugging operations.

Memory management registers 1565 specify the locations of data structures used in protected mode memory management. These registers may include a GDTR, IDRT, task register, and a LDTR register.

Alternative embodiments of the invention may use wider or narrower registers. Additionally, alternative embodiments of the invention may use more, less, or different register files and registers.

Instruction Sets

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Example Instruction Formats

Embodiments of the instruction(s) described herein may be embodied in different formats. Additionally, example systems, architectures, and pipelines are detailed below. Embodiments of the instruction(s) may be executed on such systems, architectures, and pipelines, but are not limited to those detailed.

Figure 16:
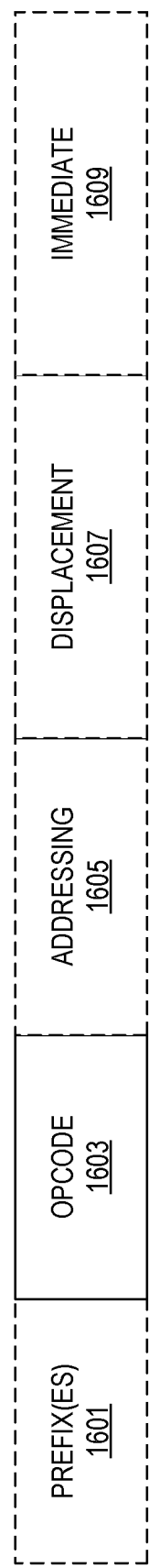
FIG. 16 illustrates embodiments of an instruction format.

FIG. 16 illustrates embodiments of an instruction format. As illustrated, an instruction may include multiple components including, but not limited to, one or more fields for: one or more prefixes 1601, an opcode 1603, addressing information 1605 (e.g., register identifiers, memory addressing information, etc.), a displacement value 1607, and/or an immediate 1609. Note that some instructions utilize some or all of the fields of the format whereas others may only use the field for the opcode 1603. In some embodiments, the order illustrated is the order in which these fields are to be encoded, however, it should be appreciated that in other embodiments these fields may be encoded in a different order, combined, etc.

The prefix(es) field(s) 1601, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1603 is used to at least partially define the operation to be performed upon a decoding of the instruction. In some embodiments, a primary opcode encoded in the opcode field 1603 is 1, 2, or 3 bytes in length. In other embodiments, a primary opcode can be a different length. An additional 3-bit opcode field is sometimes encoded in another field.

Figure 17:
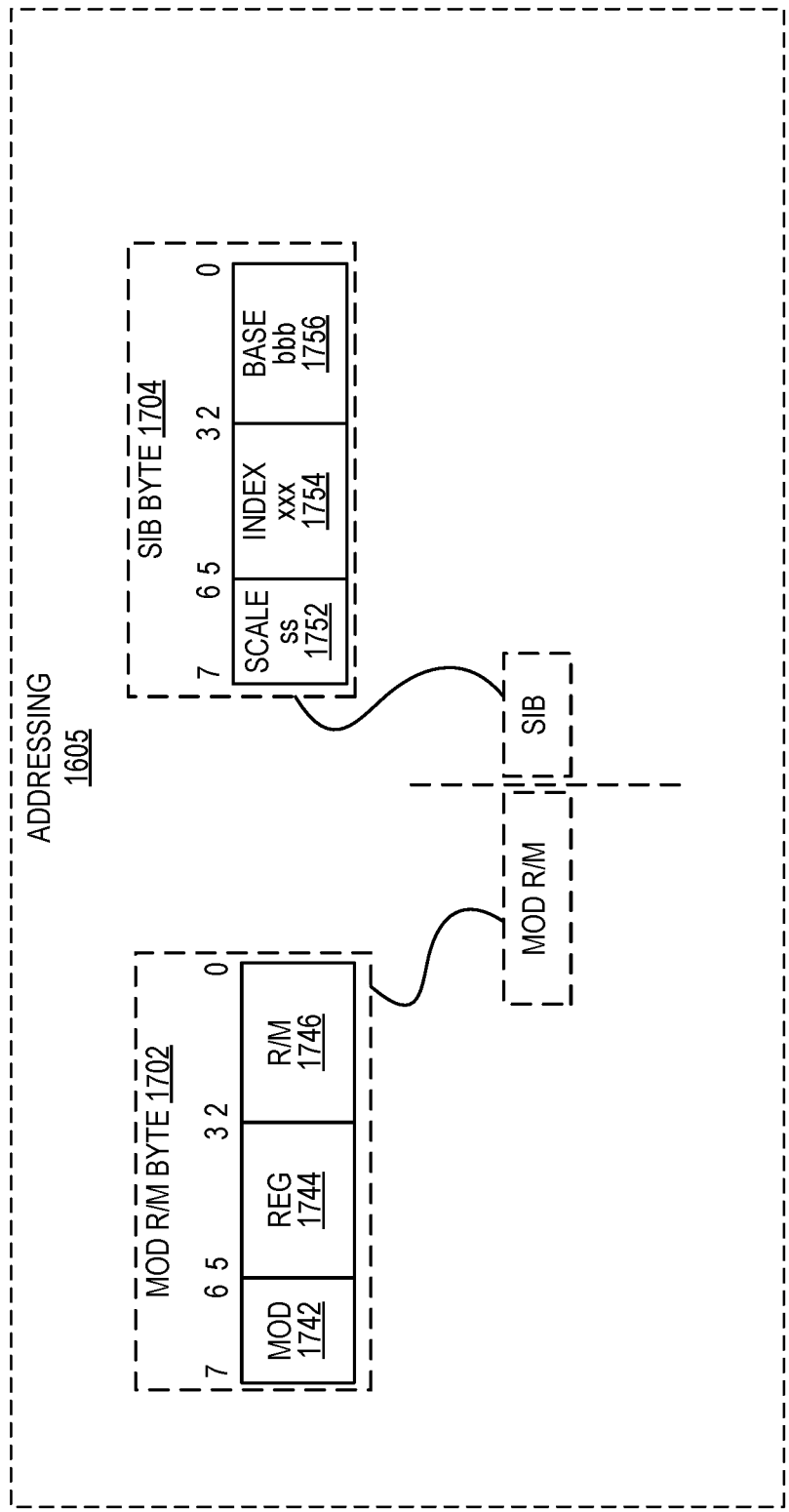
FIG. 17 illustrates embodiments of an addressing field.

The addressing field 1605 is used to address one or more operands of the instruction, such as a location in memory or one or more registers. FIG. 17 illustrates embodiments of the addressing field 1605. In this illustration, an optional ModR/M byte 1702 and an optional Scale, Index, Base (SIB) byte 1704 are shown. The ModR/M byte 1702 and the SIB byte 1704 are used to encode up to two operands of an instruction, each of which is a direct register or effective memory address. Note that each of these fields are optional in that not all instructions include one or more of these fields. The MOD R/M byte 1702 includes a MOD field 1742, a register field 1744, and R/M field 1746.

The content of the MOD field 1742 distinguishes between memory access and non-memory access modes. In some embodiments, when the MOD field 1742 has a value of b11, a register-direct addressing mode is utilized, and otherwise register-indirect addressing is used.

The register field 1744 may encode either the destination register operand or a source register operand, or may encode an opcode extension and not be used to encode any instruction operand. The content of register index field 1744, directly or through address generation, specifies the locations of a source or destination operand (either in a register or in memory). In some embodiments, the register field 1744 is supplemented with an additional bit from a prefix (e.g., prefix 1601) to allow for greater addressing.

The R/M field 1746 may be used to encode an instruction operand that references a memory address, or may be used to encode either the destination register operand or a source register operand. Note the R/M field 1746 may be combined with the MOD field 1742 to dictate an addressing mode in some embodiments.

The SIB byte 1704 includes a scale field 1752, an index field 1754, and a base field 1756 to be used in the generation of an address. The scale field 1752 indicates scaling factor. The index field 1754 specifies an index register to use. In some embodiments, the index field 1754 is supplemented with an additional bit from a prefix (e.g., prefix 1601) to allow for greater addressing. The base field 1756 specifies a base register to use. In some embodiments, the base field 1756 is supplemented with an additional bit from a prefix (e.g., prefix 1601) to allow for greater addressing. In practice, the content of the scale field 1752 allows for the scaling of the content of the index field 1754 for memory address generation (e.g., for address generation that uses $2^{scale}*\text{index}+\text{base}$).

Some addressing forms utilize a displacement value to generate a memory address. For example, a memory address may be generated according to $2^{scale}*\text{index}+\text{base}+\text{displacement}$, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 1607 provides this value. Additionally, in some embodiments, a displacement factor usage is encoded in the MOD field of the addressing field 1605 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 1607.

In some embodiments, an immediate field 1609 specifies an immediate for the instruction. An immediate may be encoded as a 1-byte value, a 2-byte value, a 4-byte value, etc.

FIG. 18 illustrates embodiments of a first prefix 1601(A). In some embodiments, the first prefix 1601(A) is an embodiment of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1601(A) may specify up to three registers using 3-bit fields depending on the format: 1) using the reg field 1744 and the R/M field 1746 of the Mod R/M byte 1702; 2) using the Mod R/M byte 1702 with the SIB byte 1704 including using the reg field 1744 and the base field 1756 and index field 1754; or 3) using the register field of an opcode.

In the first prefix 1601(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 (2⁴) registers to be addressed, whereas the MOD R/M reg field 1744 and MOD R/M R/M field 1746 alone can each only address 8 registers.

In the first prefix 1601(A), bit position 2 (R) may an extension of the MOD R/M reg field 1744 and may be used to modify the ModR/M reg field 1744 when that field encodes a general-purpose register, a 64-bit packed data register (e.g., an SSE register), or a control or debug register. R is ignored when Mod R/M byte 1702 specifies other registers or defines an extended opcode.

Bit position 1 (X) X bit may modify the SIB byte index field 1754.

Bit position B (B) B may modify the base in the Mod R/M R/M field 1746 or the SIB byte base field 1756; or it may modify the opcode register field used for accessing general purpose registers (e.g., general purpose registers 1525).

FIGS. 19(A)-(D) illustrate embodiments of how the R, X, and B fields of the first prefix 1601(A) are used. FIG. 19(A) illustrates R and B from the first prefix 1601(A) being used to extend the reg field 1744 and R/M field 1746 of the MOD R/M byte 1702 when the SIB byte 1704 is not used for memory addressing. FIG. 19(B) illustrates R and B from the first prefix 1601(A) being used to extend the reg field 1744 and R/M field 1746 of the MOD R/M byte 1702 when the SIB byte 1704 is not used (register-register addressing). FIG. 19(C) illustrates R, X, and B from the first prefix 1601(A) being used to extend the reg field 1744 of the MOD R/M byte 1702 and the index field 1754 and base field 1756 when the SIB byte 1704 being used for memory addressing. FIG. 19(D) illustrates B from the first prefix 1601(A) being used to extend the reg field 1744 of the MOD R/M byte 1702 when a register is encoded in the opcode 1603.

FIGS. 20(A)-(B) illustrate embodiments of a second prefix 1601(B). In some embodiments, the second prefix 1601(B) is an embodiment of a VEX prefix. The second prefix 1601(B) encoding allows instructions to have more than two operands, and allows SIMD vector registers (e.g., vector/SIMD registers 1510) to be longer than 64-bits (e.g., 128-bit and 256-bit). The use of the second prefix 1601(B) provides for three-operand (or more) syntax. For example, previous two-operand instructions performed operations such as A=A+B, which overwrites a source operand. The use of the second prefix 1601(B) enables operands to perform nondestructive operations such as A=B+C.

In some embodiments, the second prefix 1601(B) comes in two forms—a two-byte form and a three-byte form. The two-byte second prefix 1601(B) is used mainly for 128-bit, scalar, and some 256-bit instructions; while the three-byte second prefix 1601(B) provides a compact replacement of the first prefix 1601(A) and 3-byte opcode instructions.

FIG. 20(A) illustrates embodiments of a two-byte form of the second prefix 1601(B). In one example, a format field 2001 (byte 0 2003) contains the value C5H. In one example, byte 1 2005 includes a "R" value in bit[7]. This value is the complement of the same value of the first prefix 1601(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in is complement form for certain vector shifts; or 3) not encode any operand, the field is reserved and should contain a certain value, such as 1111b.

Instructions that use this prefix may use the Mod R/M R/M field 1746 to encode the instruction operand that references a memory address or encode either the destination register operand or a source register operand.

Instructions that use this prefix may use the Mod R/M reg field 1744 to encode either the destination register operand or a source register operand, be treated as an opcode extension and not used to encode any instruction operand.

For instruction syntax that support four operands, vvvv, the Mod R/M R/M field 1746 and the Mod R/M reg field 1744 encode three of the four operands. Bits[7:4] of the immediate 1609 are then used to encode the third source register operand.

FIG. 20(B) illustrates embodiments of a three-byte form of the second prefix 1601(B). in one example, a format field 2011 (byte 0 2013) contains the value C4H. Byte 1 2015 includes in bits[7:5] "R," "X," and "B" which are the complements of the same values of the first prefix 1601(A). Bits[4:0] of byte 1 2015 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 2017 is used similar to W of the first prefix 1601(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in is complement form for certain vector shifts; or 3) not encode any operand, the field is reserved and should contain a certain value, such as 1111b.

Instructions that use this prefix may use the Mod R/M R/M field 1746 to encode the instruction operand that references a memory address or encode either the destination register operand or a source register operand.

Instructions that use this prefix may use the Mod R/M reg field 1744 to encode either the destination register operand or a source register operand, be treated as an opcode extension and not used to encode any instruction operand.

For instruction syntax that support four operands, vvvv, the Mod R/M R/M field 1746, and the Mod R/M reg field 1744 encode three of the four operands. Bits[7:4] of the immediate 1609 are then used to encode the third source register operand.

Figure 21:
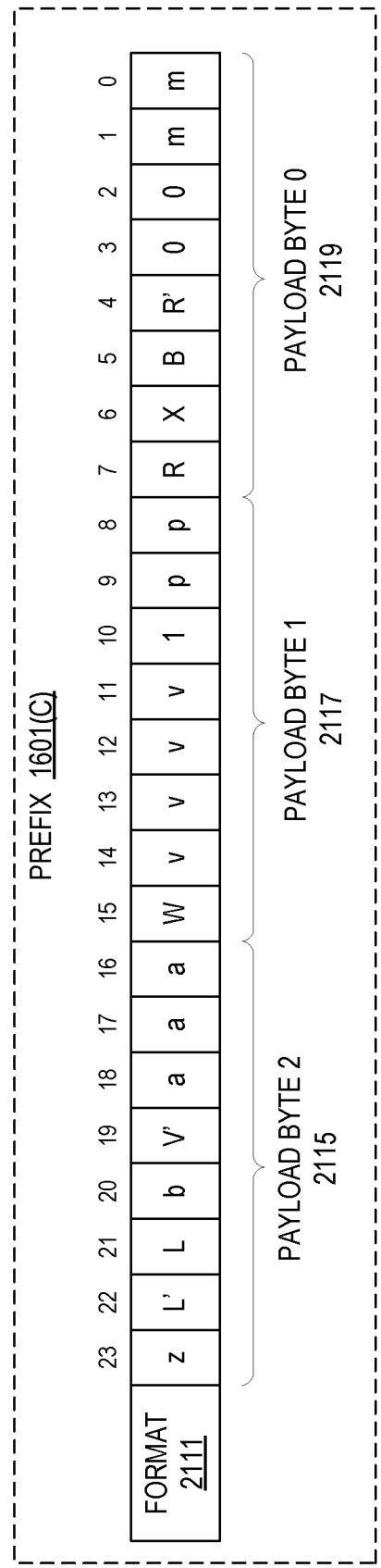
FIG. 21 illustrates embodiments of a third prefix.

FIG. 21 illustrates embodiments of a third prefix 1601(C). In some embodiments, the first prefix 1601(A) is an embodiment of an EVEX prefix. The third prefix 1601(C) is a four-byte prefix.

The third prefix 1601(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 15) or predication utilize this prefix. Opmask register allow for conditional processing or selection control. Opmask instructions, whose source/destination operands are opmask registers and treat the content of an opmask register as a single value, are encoded using the second prefix 1601(B).

The third prefix 1601(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1601(C) is a format field 2111 that has a value, in one example, of 62H. Subsequent bytes are referred to as payload bytes 2115-2119 and collectively form a 24-bit value of P[23:0] providing specific capability in the form of one or more fields (detailed herein).

In some embodiments, P[1:0] of payload byte 2119 are identical to the low two mmmmm bits. P[3:2] are reserved in some embodiments. Bit P[4] (R') allows access to the high 16 vector register set when combined with P[7] and the ModR/M reg field 1744. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1744 and ModR/M R/M field 1746. P[9:8] provide opcode extensionality equivalent to some legacy prefixes (e.g., 00=no prefix, 01=66H, 10=F3H, and 11=F2H). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1601(A) and second prefix 1611(B) and may serve as an opcode extension bit or operand size promotion.

P[18:16] specify the index of a register in the opmask (writemask) registers (e.g., writemask/predicate registers 1515). In one embodiment of the invention, the specific value aaa=000 has a special behavior implying no opmask is used for the particular instruction (this may be implemented in a variety of ways including the use of an opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the invention are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Example embodiments of encoding of registers in instructions using the third prefix 1601(C) are detailed in the following tables.

TABLE 2

32-Register Support in 64-bit Mode

|  | 4 | 3 | [2:0] | REG. TYPE | COMMON USAGES |
|---|---|---|---|---|---|
| REG | R' | R | ModR/M reg | GPR, Vector | Destination or Source |
| VVVV | V' |  | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 3

Encoding Register Specifiers in 32-bit Mode

|  | [2:0] | REG. TYPE | COMMON USAGES |
|---|---|---|---|
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 4

Opmask Register Specifier Encoding

|  | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-7 | $1^{st}$ Source |
| {k1} | aaa | $k0^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 22:
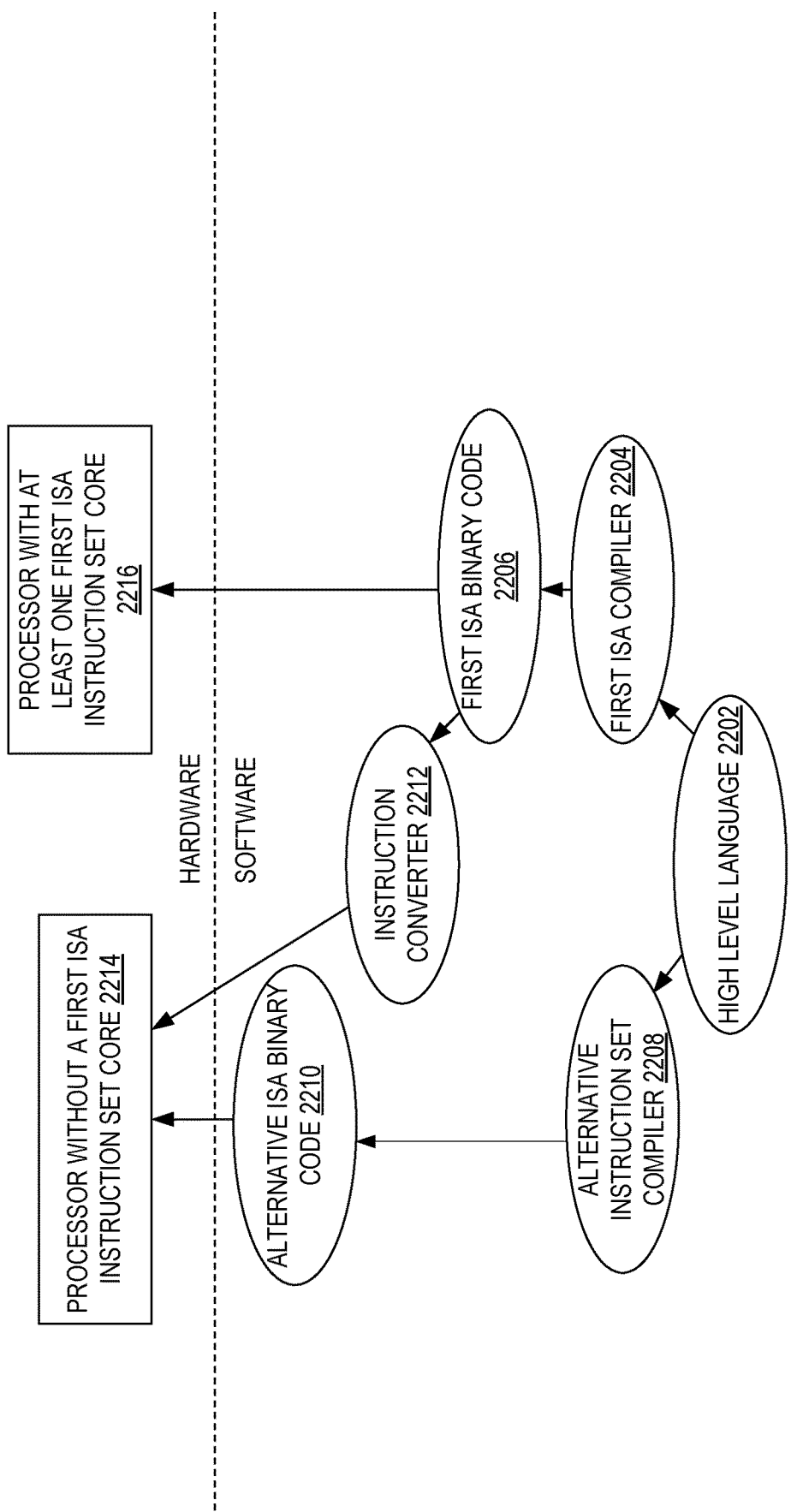
FIG. 22 illustrates a block diagram contrasting the use of a software instruction converter to convert binary instructions in a source instruction set to binary instructions in a target instruction set according to embodiments of the invention.

FIG. 22 illustrates a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 22 shows a program in a high-level language 2202 may be compiled using a first ISA compiler 2204 to generate first ISA binary code 2206 that may be natively executed by a processor with at least one first instruction set core 2216. The processor with at least one first ISA instruction set core 2216 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 2204 represents a compiler that is operable to generate first ISA binary code 2206 (e.g., object code) that can, with or without additional linkage processing, be executed on the processor with at least one first ISA instruction set core 2216. Similarly, FIG. 22 shows the program in the high-level language 2202 may be compiled using an alternative instruction set compiler 2208 to generate alternative instruction set binary code 2210 that may be natively executed by a processor without a first ISA instruction set core 2214. The instruction converter 2212 is used to convert the first ISA binary code 2206 into code that may be natively executed by the processor without a first ISA instruction set core 2214. This converted code is not likely to be the same as the alternative instruction set binary code 2210 because an instruction converter capable of this is difficult to make; however, the converted code will accomplish the general operation and be made up of instructions from the alternative instruction set. Thus, the instruction converter 2212 represents software, firmware, hardware, or a combination thereof that, through emulation, simulation, or any other process, allows a processor or other electronic device that does not have a first ISA instruction set processor or core to execute the first ISA binary code 2206.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A processing system comprising:
 a memory to store an interrupt control data structure associated with a first application being executed by the processing system; and
 a processing core including an instruction decoder to decode a first instruction, invoked by a second application, to send an interprocessor interrupt to the first application, the processor core, in response to the decoded instruction, to:
determine that an identifier of the interprocessor interrupt matches a notification interrupt vector associated with the first application,
set, in the interrupt control data structure, a pending interrupt flag corresponding to an identifier of the interprocessor interrupt,
responsive to setting the pending interrupt flag, trigger a micro-architectural event indicating pendency of the interprocessor interrupt, and
invoke an interrupt handler for the interprocessor interrupt identified by the interrupt control data structure.

2. The processing system of claim 1, wherein the processing core is further to:
invoke the interrupt handler responsive to detecting the micro-architectural event.

3. The processing system of claim 1, wherein the interrupt control data structure includes a bitmap comprising plurality of pending interrupt bits, wherein a position of each bit within the bitmap corresponds to an interrupt identifier.

4. The processing system of claim 1, further comprising a processing logic to:
responsive to identifying the interprocessor interrupt as a user-level interrupt, identify an address of a posted interrupt descriptor associated with the first application;
set, in the posted interrupt descriptor data structure, a flag corresponding to an identifier of the interprocessor interrupt; and
transmit a notification interrupt having an interrupt number identified by the posted interrupt descriptor.

5. The processing system of claim 1, wherein invoking the interrupt handler further comprises:
storing a current value of an instruction pointer on a stack; and
loading an address of the interrupt handler into the instruction pointer.

6. The processing system of claim 1, wherein the processing system is a System-on-Chip (SoC).

7. The processing system of claim 1, wherein invoking the interrupt handler further comprises:
selecting a highest priority pending interrupt among pending interrupts identified by the interrupt control data structure.

8. The processing system of claim 1, wherein the notification interrupt vector is identified by a pre-defined field of a posted interrupt descriptor data structure associated with the first application.

9. A method, comprising:
invoking, by a first application being executed by a processor, a first instruction to send an interprocessor interrupt to a second application;
decoding, by an instruction decoder of the processor;
determining, by the processor in response to the decoded instruction, that an identifier of the interprocessor interrupt matches a notification interrupt vector associated with a second application being executed by the processing;
setting, in an interrupt control data structure associated with the second application, a pending interrupt flag corresponding to an identifier of the interprocessor interrupt;
responsive to setting the pending interrupt flag, triggering a micro-architectural event indicating pendency of the interprocessor interrupt; and
invoking an interrupt handler for the interprocessor interrupt identified by the interrupt control data structure.

10. The method of claim 9, further comprising:
invoking the interrupt handler responsive to detecting the micro-architectural event.

11. The method of claim 9, wherein invoking the user-level interrupt handler further comprises:
storing a current value of an instruction pointer on a stack; and
loading an address of the interrupt handler into the instruction pointer.

12. The method of claim 9, wherein the interrupt control data structure includes a bitmap comprising plurality of pending interrupt bits, wherein a position of each bit within the bitmap corresponds to an interrupt identifier.

13. The method of claim 9, further comprising:
responsive to identifying the interprocessor interrupt as a user-level interrupt, identifying an address of a posted interrupt descriptor associated with the second application;
setting, in the posted interrupt descriptor data structure, a flag corresponding to an identifier of the incoming interrupt; and
transmitting a notification interrupt having an interrupt number identified by the posted interrupt descriptor.

14. The method of claim 9, wherein invoking the interrupt handler further comprises:
selecting a highest priority pending interrupt among pending interrupts identified by the interrupt control data structure.

15. The method of claim 9, wherein the notification interrupt vector is identified by a pre-defined field of a posted interrupt descriptor data structure associated with the second application.

16. A computer-readable non-transitory storage medium comprising executable instructions that, when executed by a processing system, cause the processing system to:
decode, by an instruction decoder of a processor, a first instruction invoked by a first application being executed by a processor, the first instruction to send an interprocessor interrupt to a second application;
determine, by the processor in response to the decoded instruction, that an identifier of the interprocessor interrupt matches a notification interrupt vector associated with a second application being executed by the processing;
set, in an interrupt control data structure associated with the second application, a pending interrupt flag corresponding to an identifier of the interprocessor interrupt;
responsive to setting the pending interrupt flag, trigger a micro-architectural event indicating pendency of the interprocessor interrupt; and
invoke an interrupt handler for the interprocessor interrupt identified by the interrupt control data structure.

17. The computer-readable non-transitory storage medium of claim 16, wherein invoking the interrupt handler further comprises:
selecting a highest priority pending interrupt among pending interrupts identified by the interrupt control data structure.

18. The computer-readable non-transitory storage medium of claim 16, wherein the notification interrupt vector is identified by a pre-defined field of a posted interrupt descriptor data structure associated with the second application.

* * * * *